United States Patent
Krah et al.

(10) Patent No.: US 10,845,930 B2
(45) Date of Patent: Nov. 24, 2020

(54) COMMON MODE NOISE MITIGATION FOR INTEGRATED TOUCH SCREENS

(71) Applicant: Apple Inc., Cupertino, CA (US)

(72) Inventors: Christoph H. Krah, Cupertino, CA (US); Du Chen, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/551,691

(22) Filed: Aug. 26, 2019

(65) Prior Publication Data

US 2020/0103993 A1    Apr. 2, 2020

Related U.S. Application Data

(60) Provisional application No. 62/738,935, filed on Sep. 28, 2018.

(51) Int. Cl.
| | |
|---|---|
| G06F 3/044 | (2006.01) |
| G06F 3/041 | (2006.01) |
| G02F 1/1333 | (2006.01) |

(52) U.S. Cl.
CPC .......... G06F 3/044 (2013.01); G02F 1/13338 (2013.01); G06F 3/0418 (2013.01)

(58) Field of Classification Search
CPC .............. G06F 2203/04103–04113; G06F 3/0488–04886; G06F 2200/1634
See application file for complete search history.

(56) References Cited

U.S. PATENT DOCUMENTS

| | | | |
|---|---|---|---|
| 9,030,441 B2 | 5/2015 | Yumoto et al. | |
| 9,081,442 B2 | 7/2015 | Yousefpor et al. | |
| 9,582,105 B2 | 2/2017 | Krah et al. | |
| 9,874,976 B2 | 1/2018 | Takeuchi et al. | |
| 2012/0044180 A1* | 2/2012 | Matsui | G06F 3/044 345/173 |
| 2016/0202798 A1 | 7/2016 | Ishikawa | |
| 2016/0282985 A1* | 9/2016 | Marques | G06F 3/0416 |
| 2016/0282986 A1* | 9/2016 | Marques | G06F 3/0416 |
| 2018/0059818 A1 | 3/2018 | Dinu et al. | |
| 2018/0082621 A1 | 3/2018 | Lin et al. | |
| 2019/0102008 A1* | 4/2019 | Takada | G06F 3/0416 |
| 2019/0324572 A1* | 10/2019 | Tan | G06F 3/04166 |
| 2020/0161493 A1* | 5/2020 | Lee | G06F 3/042 |

FOREIGN PATENT DOCUMENTS

JP    6005563 B2    10/2016

* cited by examiner

Primary Examiner — Sanghyuk Park
(74) Attorney, Agent, or Firm — Kubota & Basol LLP

(57) ABSTRACT

Some touch screens can be formed by at least partially integrating touch sensing circuitry into a display pixel stackup. In some examples, noise can be introduced into touch sensor panel measurements, for example, from display data lines of a display device proximate to the touch sensor panel. In some examples, rows or columns of touch electrodes can be split and a first portion of the touch sensor panel can be stimulated to measure capacitance and noise and a second portion of the touch sensor panel can be unstimulated and measure noise. In some examples, both the first and the second portions of the touch sensor panel can be stimulated using orthogonal stimulation codes. In some examples, measurements from the first and/or second portions of the touch sensor panel can be subtracted from measurements from the other portion of the touch sensor panel to eliminate or reduce common mode noise.

15 Claims, 14 Drawing Sheets

COMMON MODE NOISE MITIGATION FOR INTEGRATED TOUCH SCREENS

CROSS REFERENCE TO RELATED APPLICATIONS

This application claims benefit of U.S. Provisional Patent Application No. 62/738,935, filed Sep. 28, 2018, the entire disclosure of which is incorporated herein by reference for all purposes.

FIELD OF THE DISCLOSURE

This relates generally to devices including a sensor panel and, more specifically, to touch-sensitive devices configured to reduce noise levels.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electric fields used to detect touch can extend beyond the surface of the display, and objects approaching near the surface may be detected near the surface without actually touching the surface.

Capacitive touch sensor panels can be formed by a matrix of partially or fully transparent or non-transparent conductive plates (e.g., touch electrodes or sensing electrodes) made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). It is due in part to their substantial transparency that some capacitive touch sensor panels can be overlaid on a display to form a touch screen, as described above. Some touch screens can be formed by at least partially integrating touch sensing circuitry into a display pixel stackup (i.e., the stacked material layers forming the display pixels).

In some cases, the proximity between a capacitive touch sensor panels and the display can allow for noise from the display circuitry to degrade the performance of the capacitive touch sensor panel. The amount of noise interference can increase as the distance between the capacitive touch sensor panel and the display decreases.

SUMMARY OF THE DISCLOSURE

This relates to reducing noise in touch sensor panel measurements. Noise can be introduced into touch sensor panel measurements, for example, from display data lines (e.g., display electrodes) of a display device proximate to the touch sensor panel (e.g., in a touch screen). In some examples, rows or columns of touch electrodes can be split such that a first portion of the touch sensor panel can be stimulated to measure changes in capacitance and noise and a second portion of the touch sensor panel can be unstimulated and measure noise. The noise measured by the second portion can be subtracted from the measurements from the first portion to eliminate or reduce the common mode noise in the measurements from the first portion. A similar measurement scheme can be repeated to obtain measurements from the second portion eliminating or reducing common mode noise (e.g., stimulating the second portion to measure changes in capacitance and measuring noise from the unstimulated first portion). In some examples, both the first and the second portions of the touch sensor panel can be stimulated using orthogonal stimulation codes to measure changes in capacitance for the touch sensor panel from which common mode noise can be eliminated or reduced.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to reducing noise in touch sensor panel measurements. Noise can be introduced into touch sensor panel measurements, for example, from display data lines (e.g., display electrodes) of a display device proximate to with the touch sensor panel (e.g., in a touch screen). In some examples, rows or columns of touch electrodes can be split such that a first portion of the touch sensor panel can be stimulated to measure changes in capacitance and noise and a second portion of the touch sensor panel can be unstimulated and measure noise. The noise measured by the second portion can be subtracted from the measurements from the first portion to eliminate or reduce the common mode noise in the measurements from the first portion. A similar measurement scheme can be repeated to obtain measurements from the second portion eliminating or reducing common mode noise (e.g., stimulating the second portion to measure changes in capacitance and measuring noise from the unstimulated first portion). In some examples, both the first and the second portions of the touch sensor panel can be stimulated using orthogonal stimulation codes to measure changes in capacitance for the touch sensor panel from which common mode noise can be eliminated or reduced.

Figure 1A:
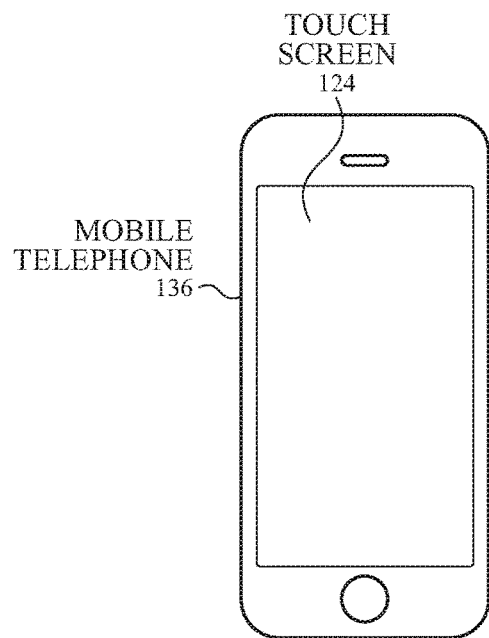
FIGS. 1A-1E illustrate example systems that can implement touch sensing and common mode noise correction according to examples of the disclosure.
Figure 1B:
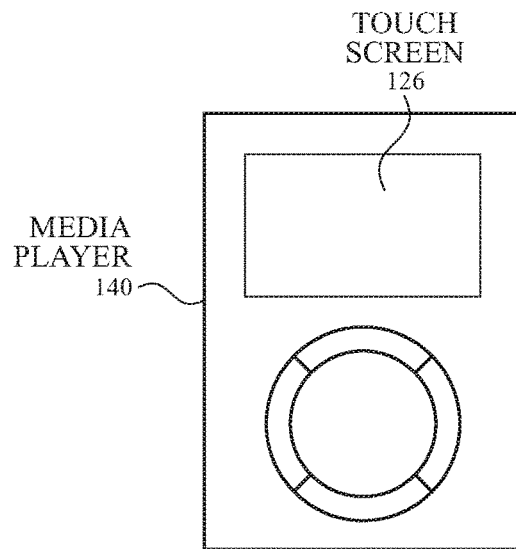
Figure 1C:
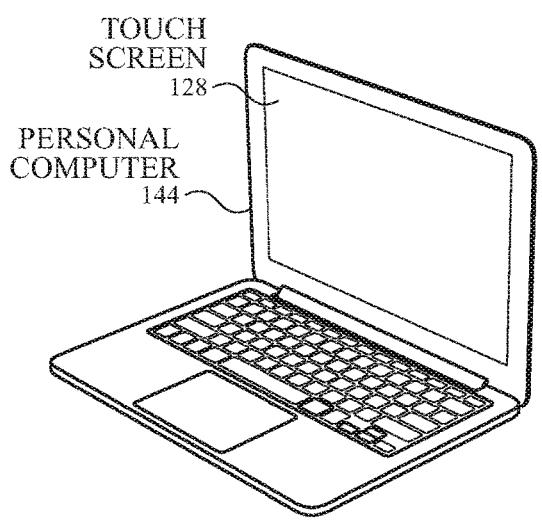
Figure 1D:
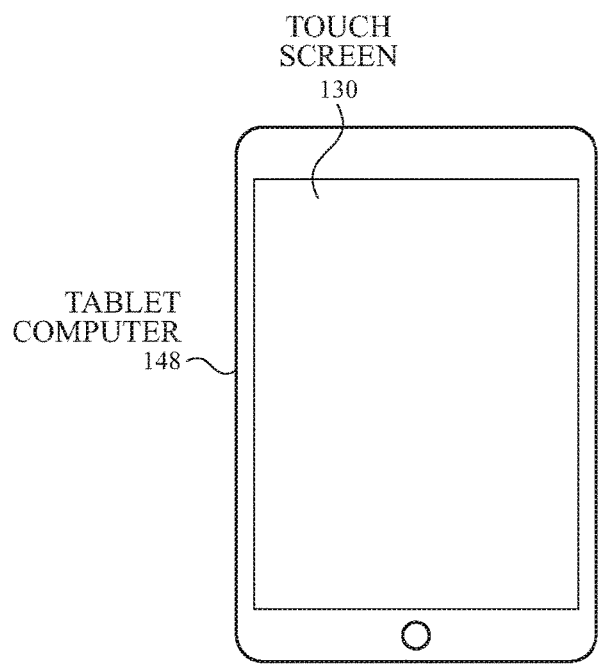
Figure 1E:
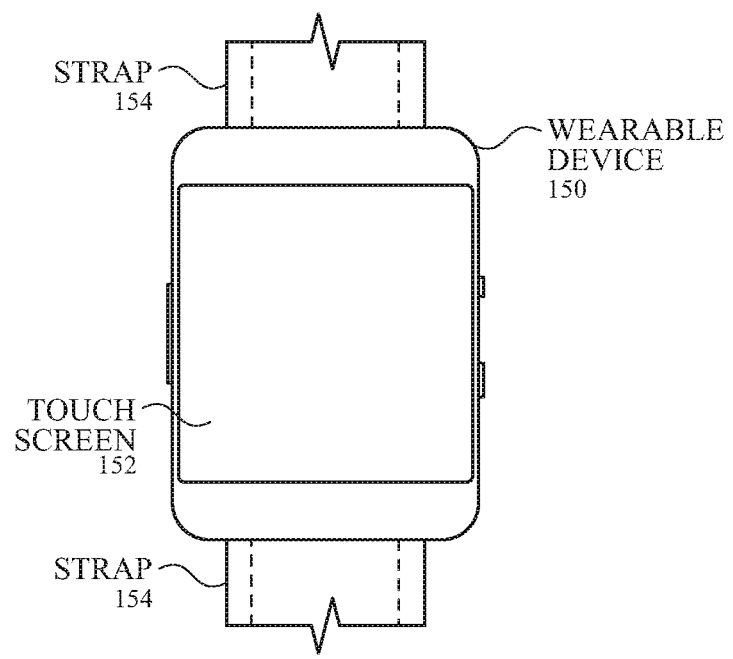

FIGS. 1A-1E illustrate example systems that can implement touch sensing and common mode noise correction according to examples of the disclosure. FIG. 1A illustrates an example mobile telephone 136 that includes a touch screen 124 and a computing system that can implement common mode noise correction according to examples of the disclosure. FIG. 1B illustrates an example digital media player 140 that includes a touch screen 126 and a computing system that can implement common mode noise correction according to examples of the disclosure. FIG. 1C illustrates an example personal computer 144 that includes a touch screen 128 and a computing system that can implement common mode noise correction according to examples of the disclosure. FIG. 1D illustrates an example tablet computing device 148 that includes a touch screen 130 and a computing system that can implement common mode noise correction according to examples of the disclosure. FIG. 1E illustrates an example wearable device 150 that includes touch screen 152 and a computing system and can be attached to a user using a strap 154 and that can implement common mode noise correction according to examples of the disclosure. The touch screen and computing system that can implement touch sensing and common mode noise correction can be implemented in other devices.

Touch screens 124, 126, 128, 130 and 150 can be based on, for example, self-capacitance or mutual capacitance sensing technology, or another touch sensing technology. For example, a self-capacitance based touch system can include a matrix of small, individual plates of conductive material that can be referred to as touch node electrodes (as described below with reference to touch screen 420 in FIG. 4). For example, a touch screen can include a plurality of individual touch node electrodes, each touch node electrode identifying or representing a unique location on the touch screen at which touch or proximity (i.e., a touch or proximity event) is to be sensed, and each touch node electrode being electrically isolated from the other touch node electrodes in the touch screen/panel. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an AC waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen. In some examples, the electrodes of a self-capacitance based touch system can be formed from rows and columns of conductive material (as described below with reference to touch screen 320 in FIG. 3), and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126, 128, 130 and 150 can be based on mutual capacitance. A mutual capacitance based touch system can include drive and sense lines that may cross over each other on different layers, or may be adjacent to each other on the same layer (e.g., as illustrated in touch screen 320 in FIG. 3). The crossing or adjacent locations can be referred to as touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen. In some examples, the electrodes of a mutual-capacitance based touch system can be formed from a matrix of small, individual plates of conductive material, and changes in the mutual capacitance between plates of conductive material can be detected, similar to above.

In some examples, touch screens 124, 126, 128, 130 and 150 can be based on mutual capacitance and/or self-capacitance. The electrodes can be arrange as a matrix of small, individual plates of conductive material (e.g., as in touch screen 420 in FIG. 4) or as drive lines and sense lines (e.g., as in touch screen 320 in FIG. 3), or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

Figure 2:
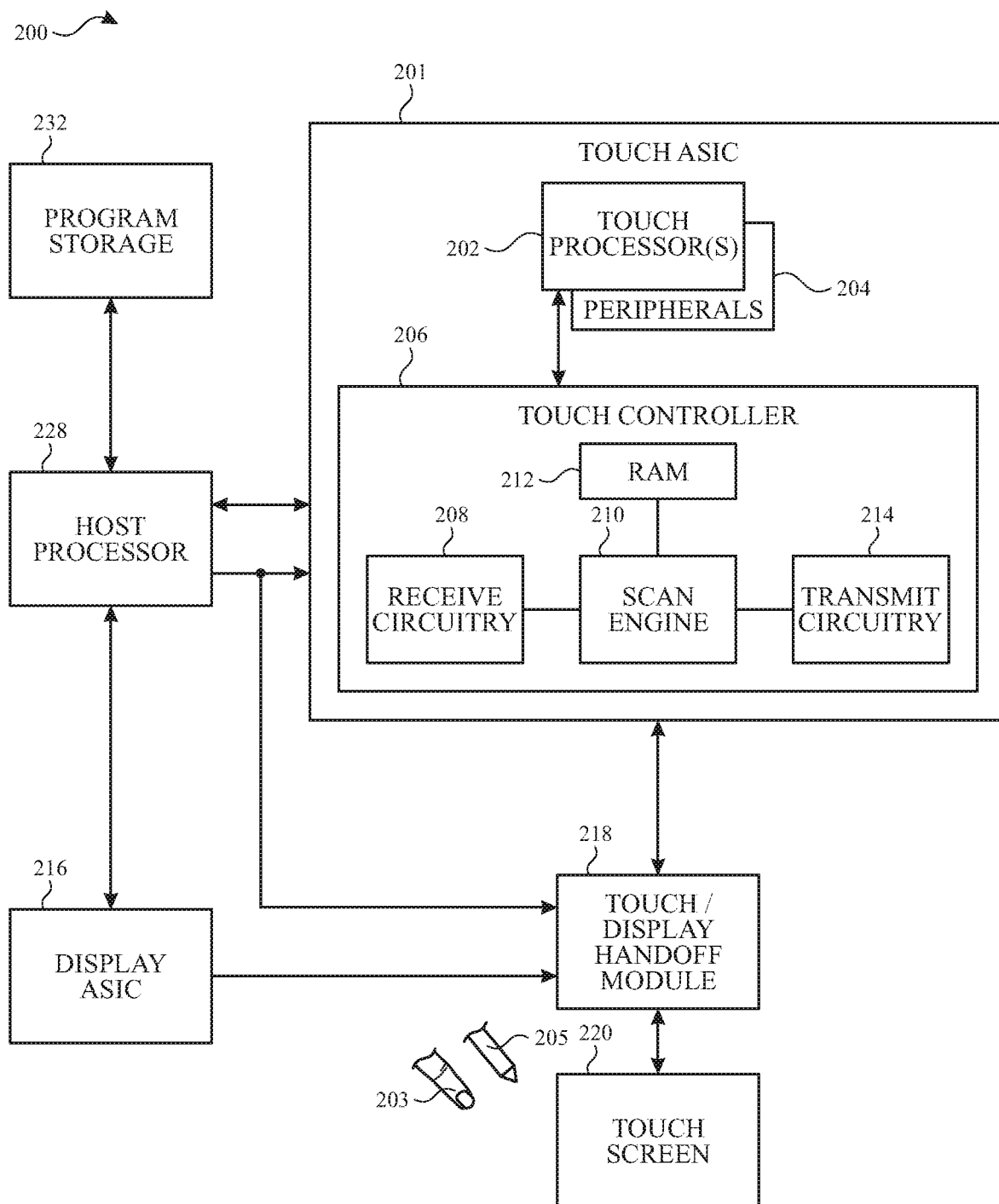
FIG. 2 illustrates a block diagram of an example computing system that can implement touch sensing and common mode noise correction according to examples of the disclosure.

FIG. 2 illustrates a block diagram of an example computing system that can implement touch sensing and common mode noise correction according to examples of the disclosure. Computing system 200 could be included in, for example, mobile telephone 136, digital media player 140, personal computer 144, tablet computing device 148, wearable device 150, or any mobile or non-mobile computing device that includes a touch screen. Computing system 200 can include an integrated touch screen 220 to display images and to detect touch and/or proximity (e.g., hover) events from an object (e.g., finger 203 or active or passive stylus 205) at or proximate to the surface of the touch screen 220. Computing system 200 can also include an application specific integrated circuit ("ASIC") illustrated as touch ASIC 201 to perform touch and/or stylus sensing operations. Touch ASIC 201 can include one or more touch processors 202, peripherals 204, and touch controller 206. Touch ASIC 201 can be coupled to touch sensing circuitry of touch screen 220 to perform touch and/or stylus sensing operations (described in more detail below). Peripherals 204 can include, but are not limited to, random access memory (RAM) or other types of memory or storage, watchdog timers or the like. Touch controller 206 can include, but is not limited to, one or more sense channels in receive circuitry 208, panel scan engine 210 (which can include channel scan logic) and transmit circuitry 214 (which can include analog or digital driver logic). In some examples, the transmit circuitry 214 and receive circuitry 208 can be reconfigurable by the panel scan engine 210 based the scan event to be executed (e.g., mutual capacitance row-column scan, mutual capacitance row-row scan, differential mutual capacitance scan, mutual capacitance column-column scan, row self-capacitance scan, column self-capacitance scan, touch spectral analysis scan, stylus spectral analysis scan, stylus scan, etc.). Panel scan engine 210 can access RAM 212, autonomously read data from the sense channels and provide control for the sense channels (e.g., described in more detail with respect to sense channel 780 in FIG. 7E). The touch controller 206 can also include a scan plan (e.g., stored in RAM 212) which can define a sequence of scan events to be performed at the touch screen. The scan plan can include information necessary for configuring or reconfiguring the transmit circuitry and receive circuitry for the specific scan event to be performed. Results (e.g., touch signals or touch data) from the various scans can also be stored in RAM 212. In addition, panel scan engine 210 can provide control for transmit circuitry 214 to generate stimulation signals at various frequencies and/or phases that can be selectively applied to drive regions of the touch sensing circuitry of touch screen 220. Touch controller 206 can also include a spectral analyzer to determine low noise frequencies for touch and stylus scanning. The spectral analyzer can perform spectral analysis on the scan results from an unstimulated touch screen. Although illustrated in FIG. 2 as a single ASIC, the various components and/or functionality of the touch ASIC 201 can be implemented with multiple circuits, elements, chips, and/or discrete components.

Computing system 200 can also include an application specific integrated circuit illustrated as display ASIC 216 to perform display operations. Display ASIC 216 can include hardware to process one or more still images and/or one or more video sequences for display on touch screen 220. Display ASIC 216 can be configured to generate read memory operations to read the data representing the frame/video sequence from a memory (not shown) through a memory controller (not shown), for example. Display ASIC 216 can be configured to perform various processing on the image data (e.g., still images, video sequences, etc.). In some examples, display ASIC 216 can be configured to scale still images and to dither, scale and/or perform color space conversion on the frames of a video sequence. Display ASIC 216 can be configured to blend the still image frames and the video sequence frames to produce output frames for display. Display ASIC 216 can also be more generally referred to as a display controller, display pipe, display control unit, or display pipeline. The display control unit can be generally any hardware and/or firmware configured to prepare a frame for display from one or more sources (e.g., still images and/or video sequences). More particularly, display ASIC 216 can be configured to retrieve source frames from one or more source buffers stored in memory, composite frames from the source buffers, and display the resulting frames on touch screen 220. Accordingly, display ASIC 216 can be configured to read one or more source buffers and composite the image data to generate the output frame.

Display ASIC 216 can provide various control and data signals to the display, including timing signals (e.g., one or more clock signals) and/or vertical blanking period and horizontal blanking interval controls. The timing signals can include a pixel clock that can indicate transmission of a pixel. The data signals can include color signals (e.g., red, green, blue). The display ASIC 216 can control the touch screen 220 in real-time, providing the data indicating the pixels to be displayed as the touch screen is displaying the image indicated by the frame. The interface to such a touch screen 220 can be, for example, a video graphics array (VGA) interface, a high definition multimedia interface (HDMI), a digital video interface (DVI), a LCD interface, an LED display interface, an OLED display interface, a plasma interface, or any other suitable interface.

In some examples, a handoff module 218 can also be included in computing system 200. Handoff module 218 can be coupled to the touch ASIC 201, display ASIC 216, and touch screen 220, and can be configured to interface the touch ASIC 201 and display ASIC 216 with touch screen 220. The handoff module 218 can appropriately operate the touch screen 220 according to the scanning/sensing and display instructions from the touch ASIC 201 and the display ASIC 216. In other examples, the display ASIC 216 can be coupled to display circuitry of touch screen 220 and touch ASIC 201 can be coupled to touch sensing circuitry of touch screen 220 without handoff module 218.

Touch screen 220 can use liquid crystal display (LCD) technology, light emitting polymer display (LPD) technology, light emitting diode (LED) technology, organic LED (OLED) technology, or organic electro luminescence (OEL) technology, although other display technologies can be used in other examples. In some examples, the touch sensing circuitry and display circuitry of touch screen 220 can be stacked on top of one another. For example, a touch sensor panel can cover some or all of a surface of the display (e.g., fabricated one on top of the next in a single stack-up or formed from adhering together a touch sensor panel stack-up with a display stack-up). In other examples, the touch sensing circuitry and display circuitry of touch screen 220 can be partially or wholly integrated with one another. The integration can be structural and/or functional. For example, some or all of the touch sensing circuitry can be structurally in between the substrate layers of the display (e.g., between two substrates of a display pixel cell). Portions of the touch sensing circuitry formed outside of the display pixel cell can be referred to as "on-cell" portions or layers, whereas portions of the touch sensing circuitry formed inside of the display pixel cell can be referred to as "in cell" portions or layers. Additionally, some electronic components can be shared, and used at times as touch sensing circuitry and at other times as display circuitry. For example, in some examples, common electrodes can be used for display functions during active display refresh and can be used to perform touch sensing functions during touch sensing periods. A touch screen stack-up sharing components between sensing functions and display functions can be referred to as an in-cell touch screen.

Computing system 200 can also include a host processor 228 coupled to the touch ASIC 201, and can receive outputs from touch ASIC 201 (e.g., from touch processor 202 via a communication bus, such as an serial peripheral interface (SPI) bus, for example) and perform actions based on the outputs. Host processor 228 can also be connected to program storage 232 and display ASIC 216. Host processor 228 can, for example, communicate with display ASIC 216 to generate an image on touch screen 220, such as an image of a user interface (UI), and can use touch ASIC 201 (including touch processor 202 and touch controller 206) to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Computing system 200 can include one or more processors, which can execute software or firmware implementing various functions. Specifically, for integrated touch screens which share components between touch and/or stylus sensing and display functions, the touch ASIC and display ASIC can be synchronized so as to properly share the circuitry of the touch sensor panel. The one or more processors can include one or more of the one or more touch processors 202, a processor in display ASIC 216, and/or host processor 228. In some examples, the display ASIC 216 and host processor 228 can be integrated into a single ASIC, though in other examples, the host processor 228 and display ASIC 216 can be separate circuits coupled together. In some examples, host processor 228 can act as a master circuit and can generate synchronization signals that can be used by one or more of the display ASIC 216, touch ASIC 201 and handoff module 218 to properly perform sensing and display functions for an in-cell touch screen. The synchronization signals can be communicated directly from the host processor 228 to one or more of the display ASIC 216, touch ASIC 201 and handoff module 218. Alternatively, the synchronization signals can be communicated indirectly (e.g., touch ASIC 201 or handoff module 218 can receive the synchronization signals via the display ASIC 216).

Computing system 200 can also include a wireless module (not shown). The wireless module can implement a wireless communication standard such as a WiFi®, BLUETOOTH™ or the like. The wireless module can be coupled to the touch ASIC 201 and/or host processor 228. The touch ASIC 201 and/or host processor 228 can, for example, transmit scan plan information, timing information, and/or frequency information to the wireless module to enable the wireless module to transmit the information to an active stylus, for example (i.e., a stylus capable generating and injecting a stimulation signal into a touch sensor panel). For example, the computing system 200 can transmit frequency information indicative of one or more low noise frequencies the stylus can use to generate a stimulation signals. Additionally or alternatively, timing information can be used to synchronize the stylus 205 with the computing system 200, and the scan plan information can be used to indicate to the stylus 205 when the computing system 200 performs a stylus scan and expects stylus stimulation signals (e.g., to save power by generating a stimulus only during a stylus scan period). In some examples, the wireless module can also receive information from peripheral devices, such as an active stylus 205, which can be transmitted to the touch ASIC 201 and/or host processor 228. In other examples, the wireless communication functionality can be incorporated in other components of computing system 200, rather than in a dedicated chip.

Note that one or more of the functions described herein can be performed by firmware stored in memory and executed by the touch processor in touch ASIC 201, or stored in program storage and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that the computing system 200 is not limited to the components and configuration of FIG. 2, but can include other or additional components in multiple configurations according to various examples. Additionally, the components of computing system 200 can be included within a single device, or can be distributed between multiple devices.

Figure 3:
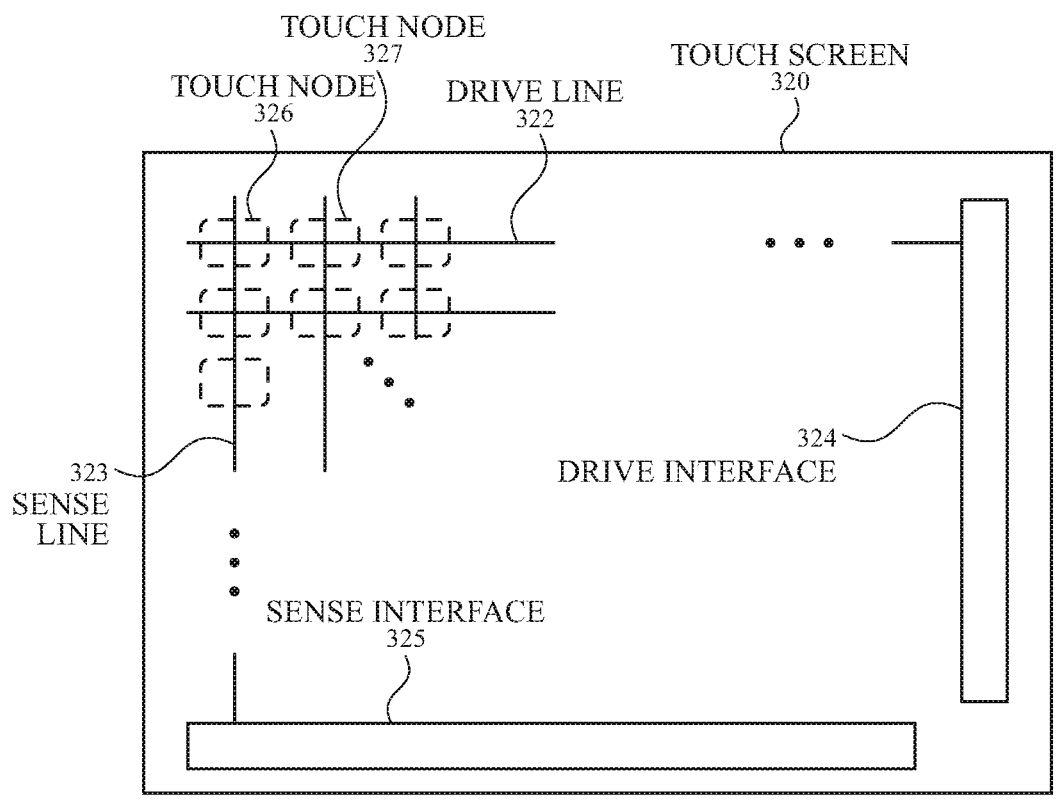
FIG. 3 illustrates an example touch screen including touch sensing circuitry configured as drive and sense regions or lines according to examples of the disclosure.

As discussed above, the touch screen 220 can include touch sensing circuitry. FIG. 3 illustrates an example touch screen including touch sensing circuitry configured as drive and sense regions or lines according to examples of the disclosure. Touch screen 320 can include touch sensing circuitry that can include a capacitive sensing medium having a plurality of drive lines 322 and a plurality of sense lines 323. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Additionally, the drive lines 322 and sense lines 323 can be formed from smaller electrodes coupled together to form drive lines and sense lines. Drive lines 322 can be coupled to transmit circuitry and sense lines 323 can be coupled to receive circuitry. As used herein, an electrical component "coupled to" or "connected to" another electrical component encompasses a direct or indirect connection providing electrical path for communication or operation between the coupled components. Thus, for example, drive lines 322 may be directly connected to transmit circuitry or indirectly connected to sense circuitry via drive interface 324, but in either case an electrical path may be provided for driving stimulation signals to drive lines. Likewise, sense lines 323 may be directly connected to sense channels or indirectly connected to sense channels via sense interface 325, but in either case an electrical path may be provided for sensing the sense lines 323. Drive lines 322 can be driven by stimulation signals from the transmit circuitry 214 through a drive interface 324, and resulting sense signals generated in sense lines 323 can be transmitted through a sense interface 325 to sense channels in receive circuitry 208 in touch controller 206. In this way, drive lines and sense lines can be part of the touch sensing circuitry that can interact to form capacitive sensing nodes, which can be thought of as touch nodes, such as touch nodes 326 and 327. This way of understanding can be particularly useful when touch screen 320 is viewed as capturing an "image" of touch (or "touch image"). In other words, after touch controller 206 has determined whether a touch has been detected at each touch node in the touch screen, the pattern of touch pixels in the touch screen at which a touch occurred can be thought of as an "image" of touch (e.g., a pattern of fingers or other objects touching the touch screen).

It should be understood that the row/drive and column/sense associations can be exemplary, and in other examples, columns can be drive lines and rows can be sense lines. In some examples, row and column electrodes can be perpendicular such that touch nodes can have x and y coordinates, though other coordinate systems can also be used, and the coordinates of the touch nodes can be defined differently. It should be understood that touch screen 220 can include any number of row electrodes and column electrodes to form the desired number and pattern of touch nodes. The electrodes of the touch sensor panel can be configured to perform various scans including some or all of row-column and/or column-row mutual capacitance scans, differential mutual capacitance scans, self-capacitance row and/or column scans, row-row mutual capacitance scans, column-column mutual capacitance scans, and stylus scans.

Figure 4:
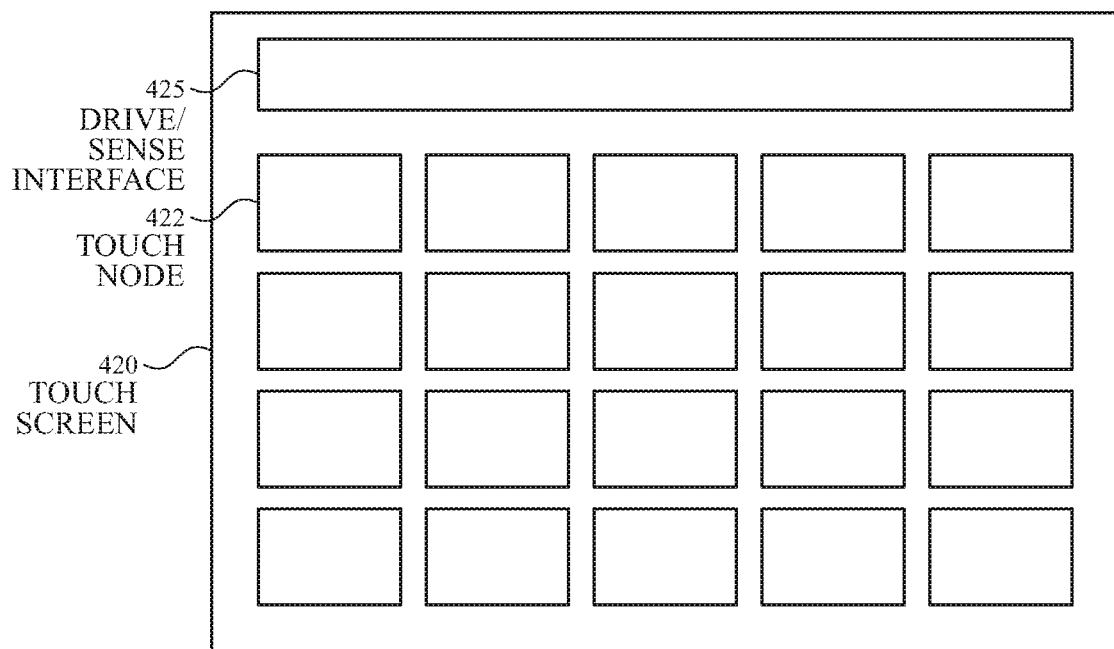
FIG. 4 illustrates an example touch screen including touch sensing circuitry configured as pixelated electrodes according to examples of the disclosure.

Additionally or alternatively, the touch screen can include touch sensing circuitry including an array of touch node electrodes arranged in a pixelated touch node electrode configuration. FIG. 4 illustrates an example touch screen including touch sensing circuitry configured as pixelated touch node electrodes according to examples of the disclosure. Touch screen 420 can include touch sensing circuitry that can include a plurality of individual touch node electrodes 422, each touch node electrode identifying or representing a unique location on the touch screen at which touch or proximity (i.e., a touch or proximity event) is to be sensed, and each touch node electrode being electrically isolated from the other touch node electrodes in the touch screen/panel. Touch node electrodes 408 can be on the same or different material layers on touch screen 420. In some examples, touch screen 420 can sense the self-capacitance of touch node electrodes 422 to detect touch and/or proximity activity on touch screen 420. For example, in a self-capacitance configuration, touch node electrodes 422 can be coupled to sense channels in receive circuitry 208 in touch controller 206, can be driven by stimulation signals from the sense channels (or transmit circuitry 214) through drive/sense interface 425, and can be sensed by the sense channels through the drive/sense interface as well, as described above. Labeling the conductive plates used to detect touch (i.e., touch node electrodes 422) as "touch pixel" electrodes can be particularly useful when touch screen 420 is viewed as capturing an "image" of touch. In other words, after touch controller 206 has determined an amount of touch detected at each touch node electrode 422 in touch screen 420, the pattern of touch node electrodes in the touch screen at which a touch occurred can be thought of as an "image" of touch (e.g., a pattern of fingers or other objects touching the touch screen). In some examples, touch screen 420 can sense the mutual capacitance between touch node electrodes 422 to detect touch and/or proximity activity on touch screen 420 Although discussed herein primarily with reference to a row-column touch sensor panel (e.g., with reference to FIGS. 6A-6C), the principles of the common mode noise correction can be applied to a pixelated touch sensor panel configured to detect mutual capacitance. Additionally, although discussed herein primarily with reference to mutual capacitance based touch sensor panels, the principles of the common mode noise correction can be applied to other capacitance based touch sensor panels (e.g., self-capacitance based touch sensor panels), resistive touch sensor panels, and other types of touch sensor panels. Additionally, it should be understood that a force sensor panel can also be implemented using mutual capacitance sensing techniques. In some examples, force sensor panel can measure mutual capacitance between electrodes mounted on the backplane of the display and electrodes mounted on a proximate flex circuit. As force is exerted, the distance between the electrodes mounted on the backplane of the display and electrodes mounted on a proximate flex circuit can change the mutual capacitance coupling therebetween. The change in mutual capacitance can be measured to detect force applied to the touch screen.

Figure 5:
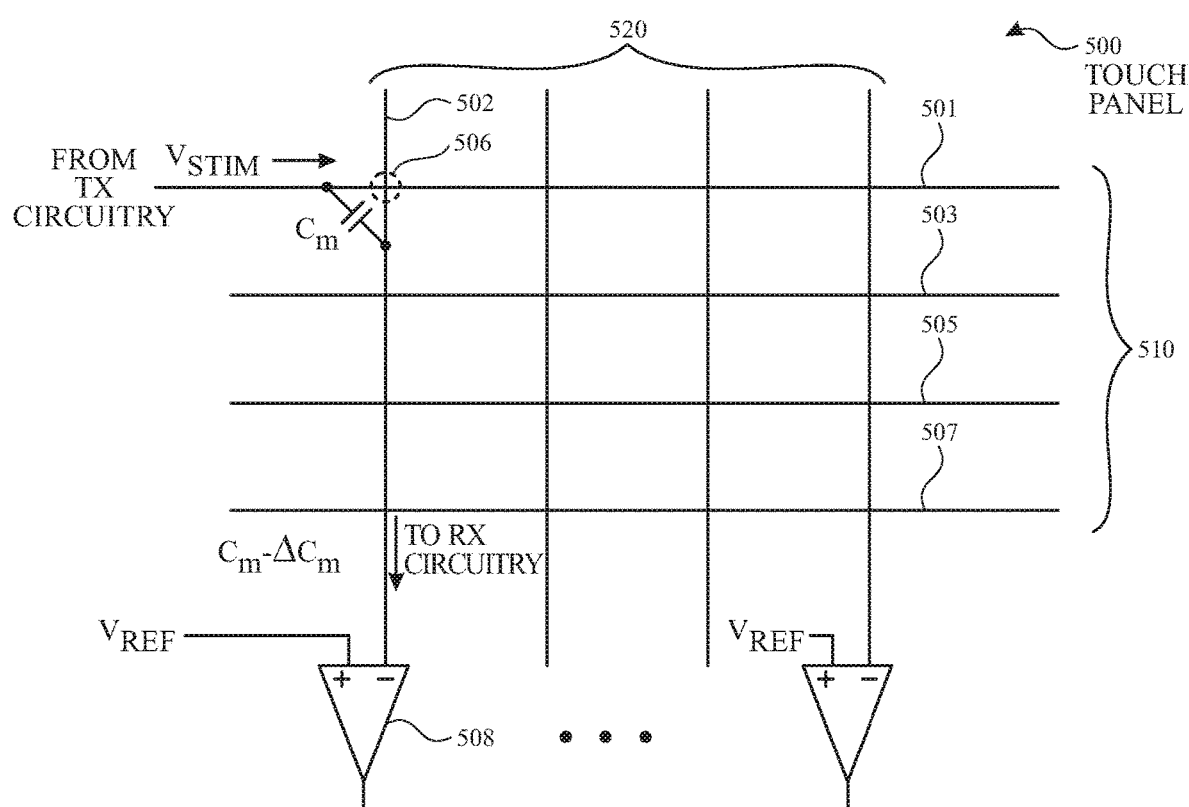
FIG. 5 illustrates an example mutual capacitance scan of an example row-column touch sensor panel.

FIG. 5 illustrates an example mutual capacitance scan of an example row-column touch sensor panel. Touch sensor panel 500 can include an array of touch nodes formed at the crossing points of row electrodes 510 and column electrodes 520. For example, touch node 506 can be formed at the crossing point of row electrode 501 and column electrode 502. During a single-stimulation mutual capacitance scan, a row electrode 501 (configured as a drive line) can be coupled to the transmit circuitry 214 which can stimulate the row electrode 501 with a drive signal ("Vstim"). One or more column electrodes (configured as sense lines) can be coupled to the receive circuitry 208 to sense mutual capacitance (or changes in mutual capacitance) between row electrode 501 and each of the one or more column electrodes. For each step of the single-stimulation mutual capacitance scan, one row electrode can be stimulated and the one or more column traces can be sensed. A touch node 506 can have a mutual capacitance Cm at the touch node 506 (between stimulated row electrode 501 and sensed column electrode 502) when there is no object touching or proximate to (e.g., within a threshold distance of) touch node 506. When an object touches or is proximate to the touch node 506 (e.g., a finger or stylus), the mutual capacitance Cm can be reduced by ΔCm, i.e., (Cm−ΔCm), corresponding to the amount of charge shunted through the object to ground. This mutual capacitance change can be sensed by sense amplifier 508 in the receive circuitry 208, which can be coupled to the column electrode 502 corresponding to touch node 506, to sense a touch signal that can be used to indicate the touch or proximity of an object at touch node 506. The sensing described with respect to touch node 506 can be repeated for the touch nodes of the touch sensor panel to generate an image of touch for the touch sensor panel (e.g., in subsequent single-stimulation mutual capacitance steps different row electrodes, such as row electrodes 503, 505, and 507, can be stimulated). In examples with a dedicated sense amplifier 508 for each column electrode (sense line) and N row electrodes (drive lines), the touch image for the touch sensor panel can be generated using N single-stimulation mutual capacitance scan steps.

In some examples, rather than using a single-stimulation mutual capacitance scan, the row-column touch sensor panel 500 can be stimulated using a multi-stimulation ("multi-stim") mutual capacitance scan. In multi-stim scan, multiple drive lines (e.g., row electrodes 510) can be simultaneous stimulated with different stimulation signals for multiple stimulation steps, and the sense signals generated at one or more sense lines (e.g., column electrodes 520) in response to the multiple stimulation steps can be processed to determine the presence and/or amount of touch for each touch node in the touch sensor panel (corresponding to the multiple drive lines). For example, FIG. 5 illustrates four row electrodes 510 and four column electrodes 520. In some examples, each of the four row electrodes 510 can be stimulated with a drive signal Vstim, but the phases of the drive signals applied to the drive lines can be different for four stimulation steps. In some examples, the drive signal can be in-phase (Vstim+, 0° phase) or out-of-phase (Vstim−, 180° phase). For example, the polarities of the stimulation signals (e.g., cosine of the phase) for two example multi-stim scans can be represented by Table 1 or Table 2:

TABLE 1

|         | Step 1 | Step 2 | Step 3 | Step 4 |
|---------|--------|--------|--------|--------|
| Row 501 | +      | +      | +      | +      |
| Row 503 | +      | +      | −      | −      |
| Row 505 | +      | −      | −      | +      |
| Row 507 | +      | −      | +      | −      |

TABLE 2

|         | Step 1 | Step 2 | Step 3 | Step 4 |
|---------|--------|--------|--------|--------|
| Row 501 | −      | +      | −      | +      |
| Row 503 | +      | +      | −      | −      |
| Row 505 | +      | −      | +      | −      |
| Row 507 | −      | −      | +      | +      |

For each sense line and for each step, the sensed signal can include contributions from the four drive lines (e.g., due to the capacitive coupling between the four drive lines and the sense line), encoded based on the polarity of the stimulation signal. At the end of the four steps, four sensed signals for a respective sense line can be decoded based on the stimulation phases to extract the capacitive signal for each touch node formed by one of the drive lines and the respective sense line. For example, assuming a linear system, the sensed signal for a sense line for each scan step can be proportional to the total signal charge, $Q_{sig\_tot}$, which can be equal to the sum of the product of the stimulation voltage and the touch node capacitance for each touch node of the sense line. Mathematically, this can be expressed for step S by equation (1) as:

$$Q_{sig\_tot}(S) = \Sigma_{i=0}^{M} Vstim_i(S) \cdot Csig_i \quad (1)$$

where Vstim can represent the stimulation voltage indexed for drive line (row electrode) i and step S and Csig can represent the capacitance at each touch node for the sense line indexed for corresponding drive line (row electrode) i. In vector form, the above expression can be rewritten in equation (2) as:

$$\tilde{Q}_{sig\_tot} = Vstim \cdot \tilde{M} \cdot \tilde{C}sig \quad (2)$$

where $\tilde{Q}_{sig\_tot}$ can represent a vector of the sensed signals from each scan step of the multi-stim scan, Vstim can represent a constant stimulation voltage, $\tilde{M}$ can represent a matrix of polarities of the stimulation voltage (stimulation matrix) indexed by row and step (e.g., as shown in Table 1 or Table 2 above), and $\tilde{C}sig$ can represent a vector of the capacitance at each touch node for the sense line. The capacitance value at each touch node of the sense line can be decoded using equation (3):

$$\tilde{C}sig = \frac{\tilde{M}^{-1}}{Vstim} \cdot \tilde{Q}_{sig\_tot} \quad (3)$$

where $\tilde{M}^{-1}$ can represent the inverse of stimulation matrix. Repeating the measurements and calculations above for each sense line can determine a capacitance signal for each touch node of the touch sensor panel scanned during the multi-stim scan. Although the multi-stim scan described above with respect to FIG. 5 includes four scan steps, it should be understood that the total duration of all four scan steps of the multi-stimulation scan can be the same duration as each scan step of the single-stimulation scan without any reduction in the integration time for sensing the capacitive signal at each touch node. Additional discussion of multi-stimulation touch sensing can be found in U.S. Pat. No. 7,812,827 entitled "Simultaneous Sensing Arrangement" by Steve Hotelling, et al. (filed Jan. 3, 2007) and in U.S. Pat. No. 8,592,697 entitled "Single-Chip Multi-Stimulus Sensor Controller" by Steve Hotelling, et al. (filed Sep. 10, 2008) both of which are incorporated by reference herein.

Figure 9:
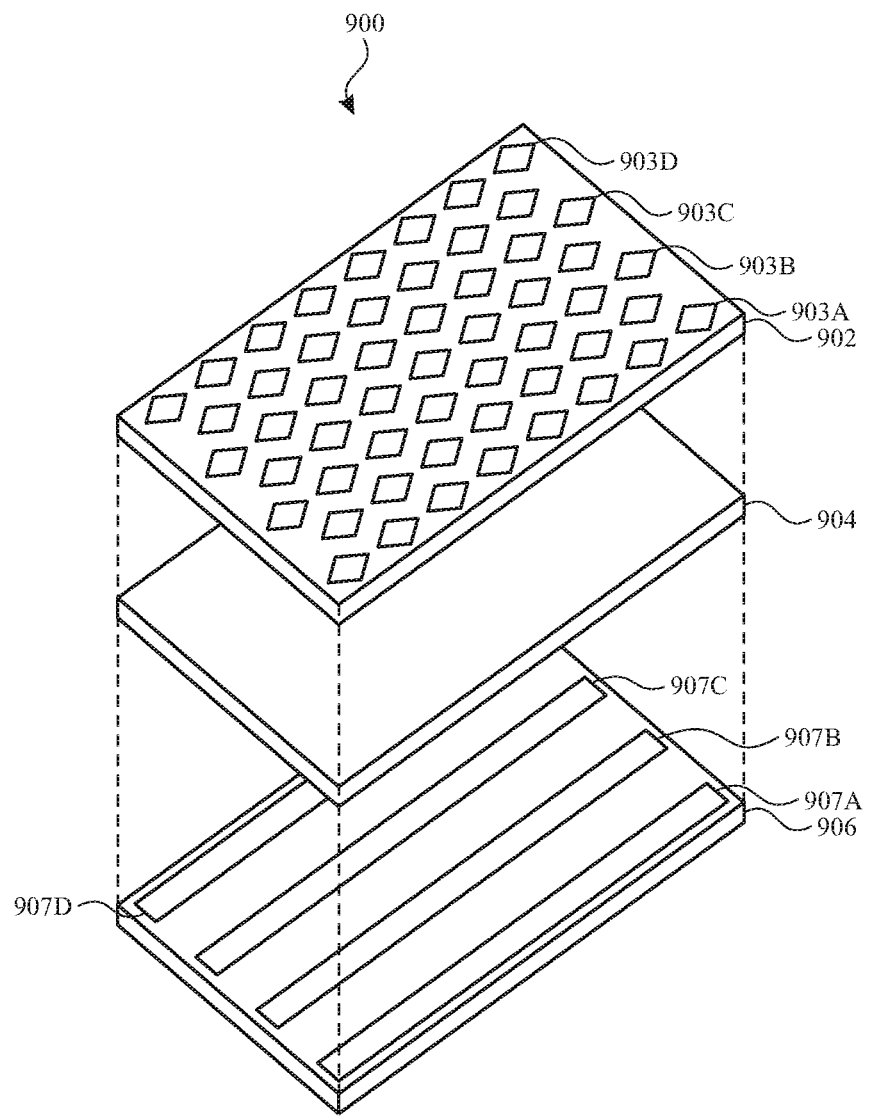
FIG. 9 illustrates an example stackup of a touch screen according to examples of this disclosure.

FIG. 9 illustrates an example stackup of a touch screen 900 according to examples of this disclosure. In some example, touch screen 900 can have one or more touch circuitry layers, including touch sensor panel layer 902, and one or more display circuitry layers (e.g., of an LED or OLED display) including a cathode layer 904 and display data layer 906. In some examples, touch sensor panel layer 902 can include touch sensor panels in accordance with examples of this disclosure (e.g., patterned touch electrodes), for example as illustrated and described with respect to FIGS. 3 and 4. In some examples, touch sensor panel layer 902 includes columns of touch electrodes and rows of touch electrodes (e.g., formed by diamond-shaped electrodes 903A-D, connections not shown). In some examples, display data layer 906 can include a plurality of display data lines 907A-D. In some examples, the display data lines provide data and/or drive elements of the LED or OLED display (e.g., to display an image). In some examples, the display data lines 907A-D can be routed in parallel to the columns of touch electrodes and perpendicular to the row of touch electrodes (e.g., as illustrated with respect to FIG. 6A, where a column of split sense electrodes 602 and 604 are disposed parallel to display data line 620 and row of drive electrodes, e.g., drive electrode 606 are disposed perpendicular to display data line 620). It is understood that although FIG. 9 illustrates one display data line disposed under each of the column of touch electrodes, multiple display data lines can be disposed beneath the columns of split sense electrodes (e.g., one or more display data line under each column or one or more display data lines under one or more of the columns). In some examples, when display data lines 907A-D can be driven (e.g., with a stimulation voltage or current), noise can be capacitively coupled onto touch electrodes 903A-D via cathode layer 904 (e.g., the stimulation signal can couple from the display data lines 907A-D to the cathode layer 904 and from cathode layer 904 to touch electrodes 903A-D). As the distance between display data lines 907A-D and touch electrodes 903A-D decreases, the amount of noise coupling between the display layers and the touch layers can increase. In some example, the noise experienced by a touch electrode from an underlying display data line can be the same or similar across the entire length of the touch electrode (e.g., a column). In other words, the noise experienced by one portion of a touch electrode can be the same or similar to the noise experienced by another portion of the touch electrode. Thus, the noise experienced by the touch electrodes from the display data lines can be "common mode noise."

Figure 6A:
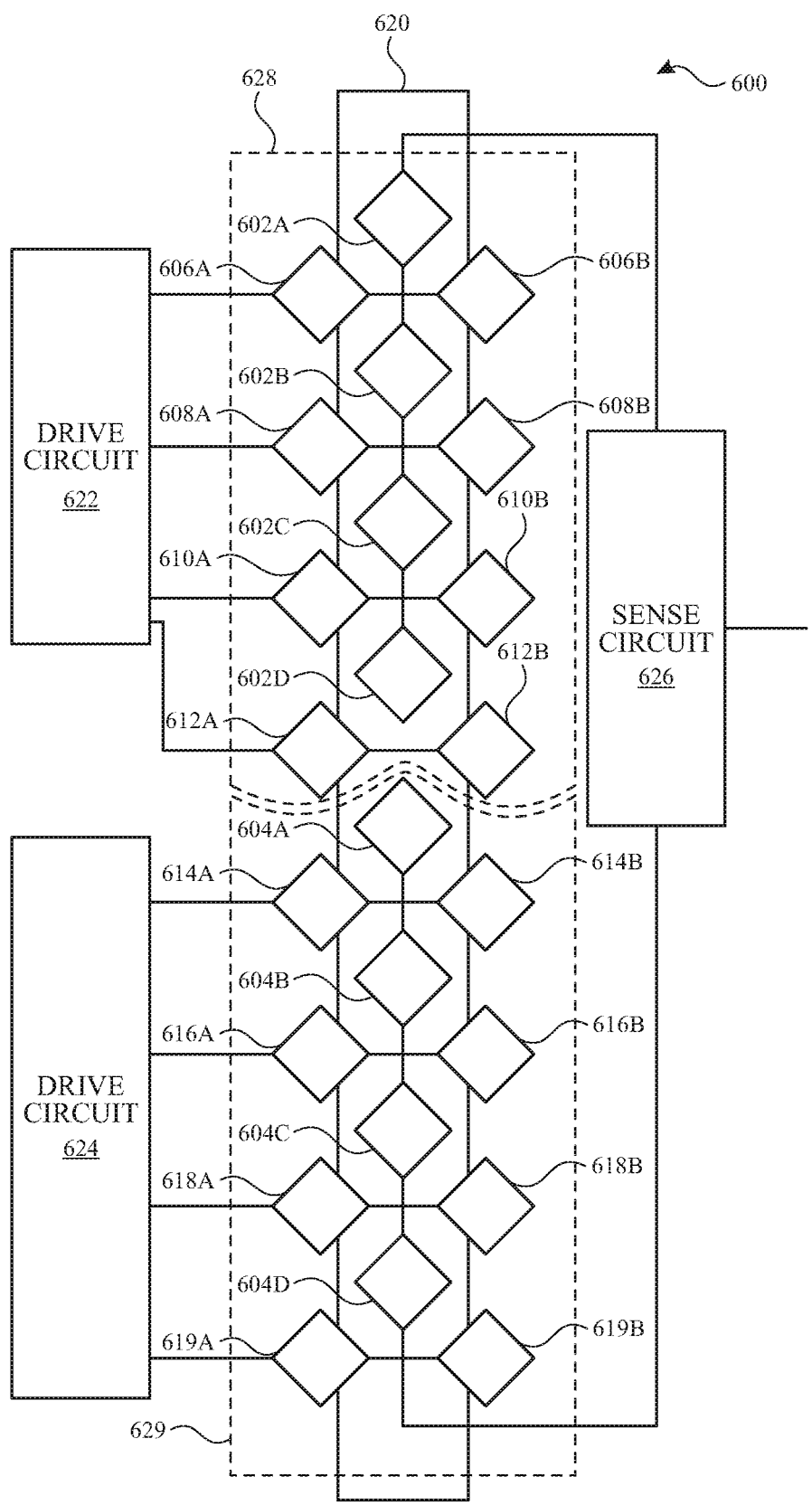
FIGS. 6A-6D illustrate portions of example touch screens according to examples of the disclosure.

As described herein, in some examples, differential banked sensing of patterned electrodes with a split sense line configuration can be used to reduce display noise coupling into touch sensing measurements. FIG. 6A illustrates a portion of an example touch screen 600 according to examples of the disclosure. In some examples, touch screen 600 can include patterned touch electrodes (e.g., row touch electrodes forming drive lines and column touch electrodes forming sense lines) configured for measuring touch (or proximity) of an object to touch screen 600. Additionally, touch screen 600 can include display data lines (e.g., display electrodes) configured to provide the data to display pixels to display an image on touch screen 600. For ease of description, one display data line 620, one column of split sense electrodes 602 and 604 (e.g., formed from patterned diamond electrodes 602A-D and 604A-D, respectively) and an overlapping portion of multiple rows of drive electrodes 606, 608, 610, 612, 614, 616, 618 and 619 (e.g., formed from patterned diamond electrodes 606A-B, 608A-B, 610A-B, 612A-B, 614A-B, 616A-B, 618A-B and 619A-B, respectively). Sense electrodes 602 and 604 can be electrically isolated from one another and not electrically coupled. Although FIG. 6A illustrates splitting the column into two sense electrodes 602 and 604, in some examples, the column can be divided or otherwise split into more than two sense electrodes. Additionally although groups of four drive electrodes are illustrated, it should be understood that the groups can include fewer electrodes (e.g., 2 electrodes) or more electrodes (e.g., 8 electrodes, etc.).

As illustrated in FIG. 6A, in some examples, display data line 620 can be disposed beneath the column of split sense electrodes 602 and 604. It is understood that although one display data line 620 is illustrated, touch screen 600 can have multiple display data lines disposed beneath (e.g., according to the stackup of layers in FIG. 9) the columns of split sense electrodes (e.g., one or more display data lines under each column, or one or more display data lines under one or more of the columns). In some examples, display data line 620 can be disposed above the column of split sense electrodes 602 and 604, and otherwise parallel to the column of split sense electrodes 602 and 604 (e.g., and perpendicular to the drive electrodes). In some examples, the display data line 620 can also be disposed beneath a portion of the row electrodes. Other widths of display data line 620 are possible without departing from the scope of this disclosure. In some examples, display data line 620 can be separated from split sense electrodes 602 and 604 by one or more layers (e.g., a dielectric layer, a cathode layer, or any other potential display stackup layers). In some examples, the proximity of display data line 620 to the column of split sense electrodes 602 and 604 can introduce noise from the display data line (or other noise sources) into the column of split sense electrodes 602 and 604 (e.g., via capacitive or other parasitic coupling mechanism) when display data line 620 is updating or otherwise driving a display. In some examples, the noise introduced by display data line 620 can be common mode noise introduced into sense electrode 602 and into sense electrode 604. In some examples, the arrangement of the display data line 620 in parallel with split sense electrode 602 and split sense electrode 604 can allow for improved correlation of noise sensed by split sense electrode 602 and split sense electrode 604 (e.g., as compared to when display data line 620 is perpendicular to split sense electrode 602 and split sense electrode 604). Thus, the common mode noise introduced into sense electrode 602 and into sense electrode 604 by display data line 620 can be the same as or similar to each other. As described in more detail below, by splitting the column into split sense electrodes 602 and 604, the common mode noise injected by the display can be mitigated or reduced.

The rows of drive electrodes and the column of sense electrodes illustrated in FIG. 6A can be coupled to touch circuitry (e.g., touch controller 206) via a drive and/or sense interface (e.g., drive interface 324, sense interface 325 and/or drive/sense interface 425). In some examples, the rows of drive electrodes can be coupled to transmit circuitry (e.g., transmit circuitry 214). In some examples, groups of multiple rows of drive electrodes can be coupled to a drive circuit configured to generate multi-stim drive signals for a bank. For example, FIG. 6A illustrates drive electrodes 606, 608, 610 and 612 (of a first bank 628) coupled to drive circuit 622 and drive electrodes 614, 616, 618 and 619 (of a second bank 629) can be coupled to drive circuit 624. Although illustrated as two distinct circuits, it is understood that drive circuit 622 and drive circuit 624 can be integrated into a single drive circuit. In some examples, to reduce drive circuitry, drive electrodes 606, 608, 610 and 612 can be coupled (e.g., via switching circuitry, such as a multiplexer, not shown) to drive circuit 622 during a first phase of a touch scan and drive electrodes 614, 616, 618 and 619 can be coupled (e.g., via switching circuitry, such as a multiplexer, not shown) to drive circuit 622 during a second phase of the touch scan (with drive circuit 624 omitted).

An exemplary method of stimulating and sensing the drive and sense electrodes, respectively, will now be described. For example, a mutual capacitance scan to generate a touch image for touch screen 600 can be divided into two phases. During a first phase of a mutual capacitance scan, the drive electrodes in the first bank 628 can be driven in a first set of steps (e.g., corresponding to the stimulation matrix illustrated in Table 1 or Table 2) and a mutual capacitance or change in mutual capacitance between the drive electrodes of the first bank 628 and sense electrode of the first bank 628 (e.g., sense electrodes 602) can be measured. During a second phase of the mutual capacitance scan, the drive electrodes in the second bank 629 can be driven in a second set of steps (e.g., corresponding to the stimulation matrix illustrated in Table 1 or Table 2) and a mutual capacitance or change in mutual capacitance between the drive electrodes of the second bank 629 and sense electrode of the second bank 629 can be measured. During the first phase of the mutual capacitance scan the drive electrodes in the second bank 629 can be unstimulated (or grounded or otherwise stimulated with a DC signal) and noise for sense electrode of the second bank 629 can be measured, and during the second phase of the mutual capacitance scan the drive electrodes in the first bank 628 can be unstimulated (or grounded or otherwise stimulated with a DC signal) and noise for the sense electrode of the first bank 628 can be measured. During the first phase of the mutual capacitance scan, sense circuit 626 (e.g., corresponding to receive circuitry 208) can sense split sense electrodes 602 and 604 (e.g., simultaneously or nearly simultaneously within a threshold period of time). Likewise, during the second phase of the mutual capacitance scan, sense circuit 626 can sense split sense electrodes 602 and 604.

The sensing during the first phase of the mutual capacitance scan can measure capacitances of touch nodes of the first bank 628 corresponding to sense electrode 602 that can include a touch signal indicative of an object touching or proximate (within a threshold distance) of touch screen 600 and can include noise injected by display data line 620 and coupled onto sense electrode 602. The sensing during the first phase of the mutual capacitance scan can measure capacitances of touch nodes of the second bank 629 corresponding to sense electrode 604 that can include the noise injected by display data line 620 without a touch signal indicative of an object touching or proximate to touch screen 600 (e.g., because the drive electrodes in the second bank 629 are unstimulated during the first phase of the mutual capacitance scan). In some examples, the noise detected by sense electrodes 602 and 604 from the display data line 620 can be the same (or similar, e.g., within a threshold voltage level). As described herein, this noise can be referred to as "common-mode noise" because the noise appears in the same (or similar) manner on both sense electrodes 602 and 604. In some examples, sense circuit 626 can subtract the signal from the second bank 629 from the signal from the first bank 628 (e.g., using single ended or differential circuitry illustrated in FIGS. 7A-7E). Because the second bank 629 experiences the same (or similar) common mode noise as the first bank 628, subtracting the signal of the second bank 629 (representative of noise) from the signal of the first bank 628 (representative of the touch signal and noise) can eliminate or reduce the common mode noise.

In a similar manner, the sensing during the second phase of the mutual capacitance scan can measure capacitances of touch nodes of the second bank 629 corresponding to sense electrode 604 that can include a touch signal indicative of an object touching or proximate (within a threshold distance) of touch screen 600 and can include noise injected by display data line 620 and coupled onto sense electrode 604. The sensing during the second phase of the mutual capacitance scan can measure capacitances of touch nodes of the first bank 628 corresponding to sense electrode 602 that can include the noise injected by display data line 620 without a touch signal indicative of an object touching or proximate to touch screen 600. In some examples, the noise detected by sense electrodes 602 and 604 from the display data line 620 can be "common-mode noise." In some examples, sense circuit 626 can subtract the signal from the first bank 628 from the signal from the second bank 629 (e.g., using single ended or differential circuitry illustrated in FIGS. 7A-7E). Because the first bank 628 experiences the same (or similar) common mode noise as the second bank 629, subtracting the signal of the first bank 628 (representative of noise) from the signal of the second bank 629 (representative of the touch signal and noise) can eliminate or reduce the common mode noise.

As a result of the first and second phases, and the subtraction of the common mode noise from capacitive measurements of the first and second banks, the resulting signals at the touch nodes of the first and second banks can capture a touch "image" of the first and second banks (corresponding to the column of sense electrodes 602 and 604 and the multiple rows of drive electrodes 606, 608, 610, 612, 614, 616, 618, 619) filtered for common mode noise. The same measurements and subtraction can be repeated for the rest of the columns (by sense circuits similar sense circuit 626) of the touch sensor panel of touch screen 600 to form the touch image for touch screen 600 for further processing to identify and process touch input.

Figure 6B:
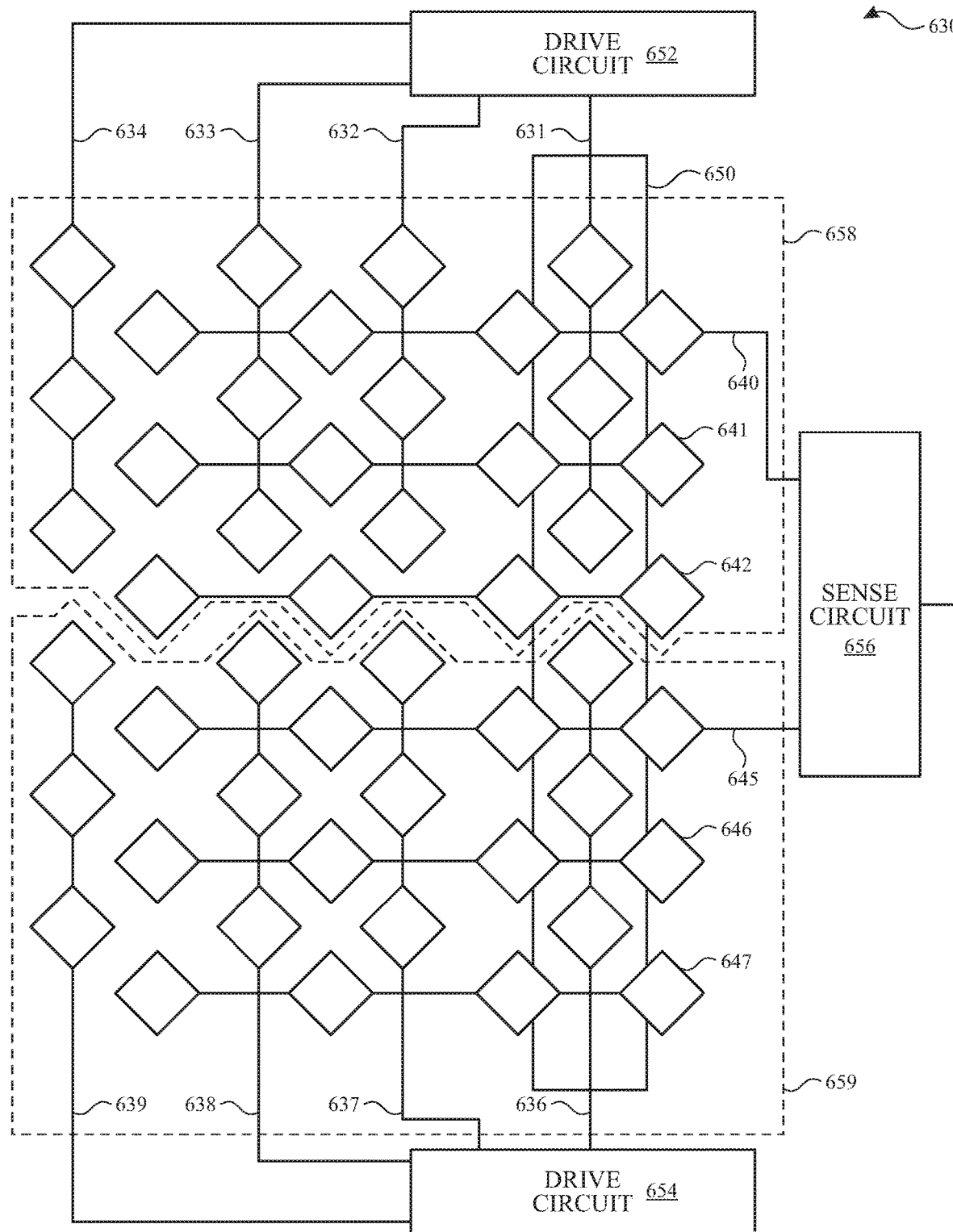

FIG. 6B illustrates a portion of an example touch screen 630 according to examples of the disclosure. In some examples, touch screen 630 can include patterned touch electrodes (e.g., column touch electrodes forming drive lines and row touch electrodes forming sense lines) configured for measuring touch (or proximity) of an object to touch screen 630. Additionally, touch screen 630 can include display data lines (e.g., display electrodes) configured to provide the data to display pixels to display an image on touch screen 630. For ease of description, one display data line 650, four columns of split drive electrodes 631, 632, 633, 634, 636, 637, 638 and 639 (e.g., formed from patterned diamond electrodes) and an overlapping portion of multiple rows of sense electrodes 640, 641, 642, 645, 646 and 647 (e.g., formed from patterned diamond electrodes). Drive electrodes in each column (e.g., 631 and 636, 632 and 637, 633 and 638, and 634 and 639) can be electrically isolated from one another and not electrically coupled. Although FIG. 6B illustrates splitting each column into two drive electrodes, in some examples, the columns can be divided or otherwise split into more than two drive electrodes. Additionally although groups of four drive electrodes are illustrated, it should be understood that the groups can include fewer electrodes (e.g., 2 electrodes) or more electrodes (e.g., 8 electrodes, etc.).

As illustrated in FIG. 6B, in some examples, display data line 650 can be disposed beneath at least one column of split drive electrodes 631 and 636. It is understood that although one display data line 650 is illustrated, touch screen 630 can have multiple display data lines disposed beneath the columns of split drive electrodes (e.g., one or more display data lines under each column or one or more display data lines under one or more of columns of split drive electrodes 632 and 637, 633 and 638, and 634 and 639). In some examples, display data line 650 can be disposed above the column of split drive electrodes 631 and 636, or otherwise parallel to the column of split drive electrodes 631 and 636 (e.g., and perpendicular to the sense electrodes). In some examples, the display data line 650 can also be disposed beneath a portion of one or more row electrodes. Other widths of display data line 650 are possible without departing from the scope of this disclosure. In some examples, display data line 650 can be separated from split drive electrodes 631 and 636 by one or more dielectric layers or a cathode layer). In some examples, the proximity of display data line 650 to the column of split drive electrodes 631 and 636 can introduce noise from the display data line (or other noise sources) into the column of split drive electrodes 631 and 636 (e.g., via capacitive or other parasitic coupling mechanism) and into rows of sense electrodes (e.g., directly or indirectly by perturbing the stimulation waveform on the drive electrodes which can be detected by the sense electrodes and translated into noise in the capacitance or change in capacitance measurements) when display data line 650 is updating or otherwise driving a display. In some examples, the noise introduced by display data line 650 can be common mode noise introduced into sense electrodes (e.g., sense electrodes 640 and 645. As described in more detail below, by splitting the columns into split drive electrodes (e.g., 631 and 636) and driving the split drive electrodes of different banks with different coded stimulation signals, the common mode noise injected by the display can be mitigated or reduced.

The column of drive electrodes and the rows of sense electrodes illustrated in FIG. 6B can be coupled to touch circuitry (e.g., touch controller 206) via a drive and/or sense interface (e.g., drive interface 324, sense interface 325 and/or drive/sense interface 425). In some examples, the column of drive electrodes can be coupled to transmit circuitry (e.g., transmit circuitry 214). In some examples, groups of multiple split drive electrodes can be coupled to a drive circuit configured to generate multi-stim drive signals for a bank. For example, FIG. 6B illustrates split drive electrodes 631, 632, 633 and 634 (of a first bank 658) coupled to drive circuit 652 and split drive electrodes 636, 637, 638 and 639 (of a second bank 659) can be coupled to drive circuit 654. Although illustrated as two distinct circuits, it is understood that drive circuit 652 and drive circuit 654 can be integrated into a single drive circuit.

An exemplary method of stimulating and sensing the drive and sense electrodes, respectively, will now be described. For example, a mutual capacitance scan can generate a touch image for touch screen 630 during one simultaneous drive/sense phase (e.g., as opposed to two distinct phases described above with respect to FIG. 6A). In some examples, the drive electrodes in the first bank 658 can be driven in a first set of steps (e.g., using a first set of coded stimulation signals) and a mutual capacitance or change in mutual capacitance between the drive electrodes of the first bank and one row of sense electrodes of the first bank 658 (e.g., sense electrode 640) can be measured. Concurrently with driving and sensing electrodes of the first bank 658, the drive electrodes in the second bank 659 can be driven in a second set of steps (e.g., using a second, orthogonal set of coded stimulation signals) and a mutual capacitance or change in mutual capacitance between the drive electrodes of the second bank 659 and a row of sense electrodes of the second bank 659 (e.g., sense electrode 645) can be measured. In some examples, sense circuit 656 (e.g., corresponding to receive circuitry 208) can sense electrodes 640 and 645 (e.g., simultaneously or nearly simultaneously within a threshold period of time).

In some examples, the sensing of the mutual capacitance scan can measure capacitances of touch nodes of the first bank 658 corresponding to sense electrode 640 that can include a touch signal indicative of an object touching or proximate (within a threshold distance) of touch screen 630 and can include noise injected by display data line 650 and coupled onto sense electrode 640. Similarly, the sensing of the mutual capacitance scan can measure capacitances of touch nodes of the second bank 659 corresponding to sense electrode 645 that can include noise injected by display data line 650 and coupled onto sense electrode 645. In some examples, the noise detected by sense electrodes 640 and 645 from the display data line 650 can be the same (or similar, e.g., within a threshold voltage level). As described herein, this noise can be referred to as "common-mode noise" because the noise appears in the same (or similar) manner on both sense electrodes 640 and 645. In some examples, sense circuit 656 can subtract the signal from the second bank from the signal from the first bank (e.g., using single ended or differential circuitry illustrated in FIGS. 7A-7E). Because the second bank experiences the same (or similar) common mode noise as the first bank, subtracting the signal of the second bank (representative of noise) from the signal of the first bank (representative of the touch signal and noise) can eliminate or reduce the common mode noise.

As a result of the driving/sensing the first and second banks, and the subtraction of the common mode noise from capacitive measurements of the first and second banks, the resulting signals at the touch nodes of the first and second banks can capture a touch "image" of the first and second bank (corresponding to the column of split drive electrodes 631, 632, 633, 634, 636, 637, 638 and 639 and the two rows of sense electrodes 640 and 645) filtered for common mode noise. The same measurements and subtraction can be repeated for the rest of the rows (by sense circuits similar sense circuit 656) of the touch sensor panel of touch screen 630 (e.g., for row sense electrodes 641 and 646 and row sense electrodes 642 and 647) to form the touch image for touch screen 630 for further processing to identify and process touch input. It should be understood that although the differential measurements are shown between equally spaced sense electrodes (e.g., the uppermost sense electrode of the first bank and the uppermost sense electrode of the second bank), differential measurements between sense electrodes can be different in some examples (e.g., a differential measurement of the uppermost sense electrode of the first bank and the lowermost sense electrode of the second bank).

The above-described method of stimulating and sensing the drive and sense electrodes assumes that an object is touching or proximate to one of the two row electrodes, but not both row electrodes simultaneously. However, it is understood that the use of different multi-stim codes can enable similar differential measurements in the scenario in which a plurality of objects is touching or proximate to both rows in the first and second bank of electrodes, touch screen 630 can capture a touch "image" of the first and second bank, including measurement of the plurality of touching or proximate objects, filtered for common mode noise. For example, touch screen 630 can be stimulated using a multi-stimulation mutual capacitance scan, with different coded multi-stimulation signals applied to split drive lines in each bank. In some examples, drive circuit 652 can drive the first bank of four split drive electrodes according to a first multi-stimulation code and drive circuit 654 can drive the second bank of four split drive electrodes according to a second different, orthogonal multi-stimulation steps, shown below in Table 3.

TABLE 3

|  | Step 1 | Step 2 | Step 3 | Step 4 | Step 5 | Step 6 | Step 7 | Step 8 |
|---|---|---|---|---|---|---|---|---|
| Column 631 | + | + | + | + | + | + | + | + |
| Column 632 | + | − | + | − | + | − | + | − |
| Column 633 | + | + | − | − | + | + | − | − |
| Column 634 | + | − | − | + | + | − | − | + |
| Column 636 | + | + | + | + | − | − | − | − |

TABLE 3-continued

|  | Step 1 | Step 2 | Step 3 | Step 4 | Step 5 | Step 6 | Step 7 | Step 8 |
|---|---|---|---|---|---|---|---|---|
| Column 637 | + | − | + | − | − | + | − | + |
| Column 638 | + | + | − | − | − | − | + | + |
| Column 639 | + | − | − | + | − | + | + | − |

In some examples, driving the two banks with different, orthogonal sets of coded multi-stimulation drive signals in eight scan steps can generate eight sensed signals (differential sensed signals). For each scan step, one sensed signal (including coded signal contributions from four drive lines (e.g., one charge on each of the four drive lines)) can be generated on the sense electrode for each respective bank. Thus, in some examples, the sensed signals for a first bank can be generated using unique multi-stim codes that are orthogonal to the unique multi-stim codes used for generating the sensed signals for the second bank. In some examples, because the sensed signals from the first bank are generated using orthogonal and unique stimulation signals different than used to for generating the sensed signals from the second bank, when sensed signals from the first bank and the second bank are combined (e.g., via a differential amplifier or other differential circuit), capacitive signals (e.g., indicative of touch) on a first bank can be orthogonal to and not conflict or interfere with capacitive signals (e.g., indicative of touch) on the second bank (e.g., by sense circuit 656 when performing common mode noise elimination or reduction). In some examples, the eight sensed signals can be processed by sense circuit 656 to identify the common mode noise components and eliminate or reduce the common mode noise to generate eight filtered sense signals (e.g., the common mode noise coupled onto the sense signals of both banks are not orthogonal and can be eliminated or reduced by the sense circuits). In some examples, a differential amplifier in sense circuit 656 can compare (e.g., combine) touch signals from the two banks (e.g., sense electrodes 640 and 645) and output a differential output which filters out the common mode noise experienced by both banks. In some examples, the eight filtered sensed signals can be decoded based on the stimulation phases to extract the capacitive signal for each touch node by one of the drive lines and the respective sense line. In some examples, a touch image for touch screen 630 can be generated using the decoded sense signals and can be further processed to identify and process the touch input. For example, equation (3) described above with reference to four drive line multi-stim example of FIG. 5, can be modified (assuming similar gain for the sense channels) and used for decoding the sense signal in a differential (eight drive lines) multi-stim example. The modification to equation (3) can include a difference in how the total charge is measured. In the four drive line multi-stim example, the total charge can be added at the sense line. For a differential multi-stim example, the total charge for the differential sense signal (e.g., the difference between sense electrodes 640 and 645 of banks 658 and 659), can be a difference between the total charge accumulated for the sense electrode of a first bank from the stimulus applied to the drive electrodes (total charge on sense electrode 640 from stimulation on drive electrodes 631-634) and the total charge accumulated for the sense electrode of the second bank from the stimulus applied to the drive electrodes (e.g., total charge on sense electrode 645 from stimulation on drive electrodes 636-639) during the first half of the stimulation steps. The total charge for the differential sense signal can be a difference between the total charge accumulated for the sense electrode of the second bank from the stimulus applied to the drive electrodes (total charge on sense electrode 645 from stimulation on drive electrodes 636-639) and the total charge accumulated for the sense electrode of the first bank from the stimulus applied to the drive electrodes (e.g., total charge on sense electrode 640 from stimulation on drive electrodes 631-634) during the second half of the stimulation steps. Because the negative input of a differential amplifier can cause an inversion, the results from the second half of the stimulation steps (for the second bank) can be inverted after applying the inverse stimulation matrix of equation (3). Additionally, although Table 3 does not account for the inversion of the differential amplifier, in some examples, the polarities of the stimulation signals can be inverted such that the results of the demodulation with the inverse stimulation matrix can have the proper polarities without having to invert the results for the second bank.

Figure 6C:
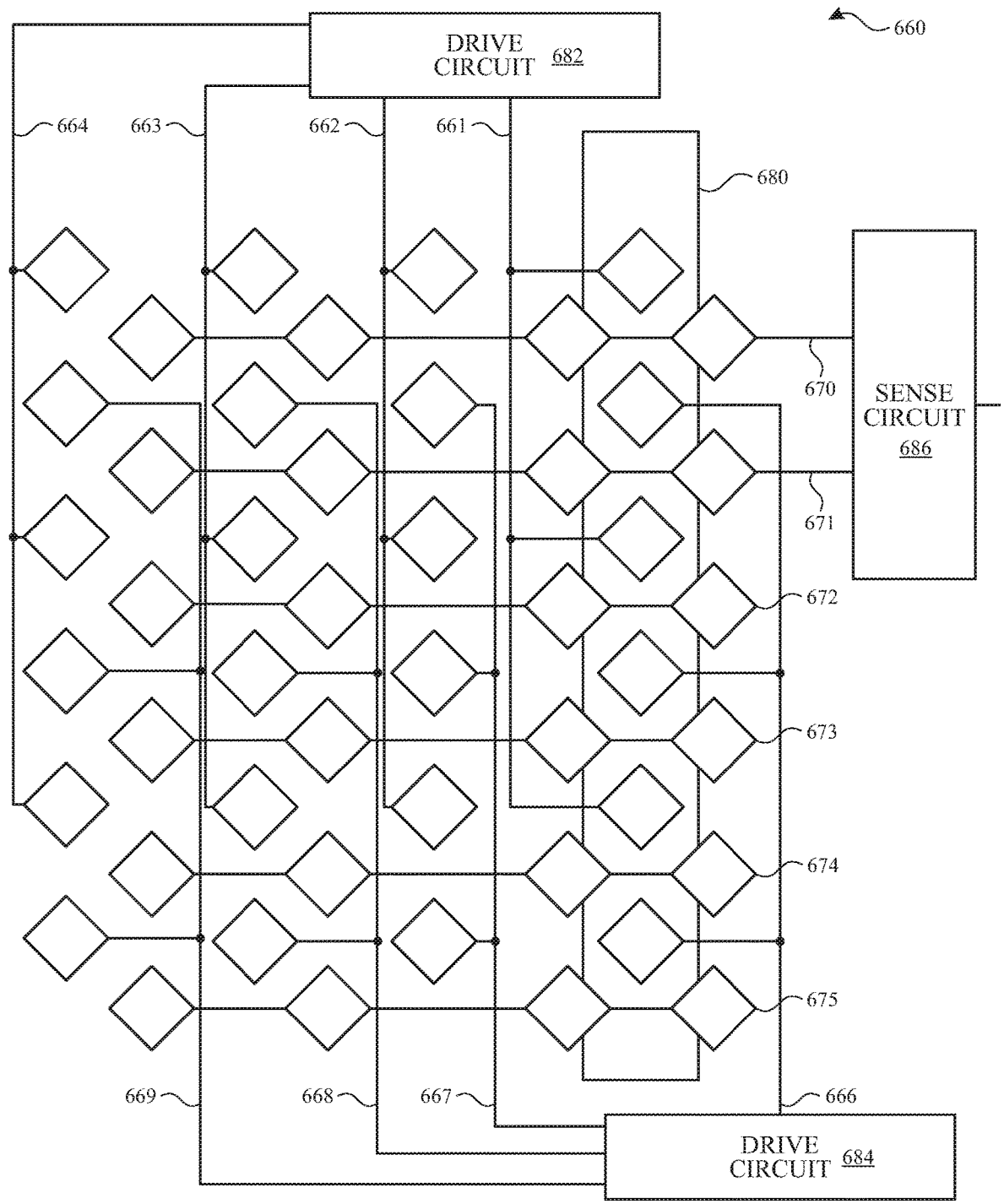

In FIG. 6B, rows in the first and second bank may be at a distance from one another and as a result, there may be differences in the common mode noise. In some examples, the common mode noise elimination or reduction can be improved by taking a differential measurement from adjacent sense electrodes that may be collocated and have more correlated common mode noise. It is understood that although adjacent sense electrodes are illustrated in FIG. 6C as adjacent, that the differential measurement may be between different measurements (e.g., to optimize the common mode noise cancellation). FIG. 6C illustrates a portion of an example touch screen 660 according to examples of the disclosure. In some examples, similarly to touch screen 630, touch screen 660 can include patterned touch electrodes (e.g., column touch electrodes forming drive lines and row touch electrodes forming sense lines) configured for measuring touch (or proximity) of an object to touch screen 660. Additionally, touch screen 660 can include display data lines (e.g., display electrodes) configured to provide the data to display pixels to display an image on touch screen 660. For ease of description, one display data line 680, four columns of split drive electrodes 661, 662, 663, 664, 666, 667, 668, and 669 (e.g., formed from patterned diamond electrodes) and an overlapping portion of multiple rows of sense electrodes 670, 671, 672, 673, 674, and 675 (e.g., formed from patterned diamond electrodes). As shown in FIG. 6C, patterned diamond electrodes of split drive electrodes 662 and 664 can be interleaved. For example, a column of split drive electrodes 662 and 664 can be arranged in the following order: a first patterned diamond electrode from drive electrode 662 (e.g., of the first bank), a first patterned diamond electrode from drive electrode 664 (e.g., of the second bank of drive electrodes), a second patterned diamond electrode from drive electrode 662 (e.g., of the first bank), a second patterned diamond electrode from drive electrode 664 (e.g., of the second bank), a third patterned diamond electrode from drive electrode 662 (e.g., of the first bank), and a third patterned diamond electrode from drive electrode 664 (e.g., of the second bank). Thus, as shown, electrodes of the first bank of drive electrodes and electrodes of the second bank of drive electrodes can be arranged alternately. As will be explained below, arranging the electrodes from the first and second bank alternately can enable sensing adjacent rows of sense electrodes. Sensing adjacent rows of sense electrodes can increase the correlation of the common mode noise between the two rows of sense electrodes (e.g., because the two sense rows are spaced closer together, the two sense rows can have common mode noise components that are more similar than when the two sense rows are at a distance from one another) and thus allow for more accurate common mode noise rejection (e.g., elimination or reduction).

Drive electrodes in each column (e.g., 661 and 666, 662 and 667, 663 and 668, 664 and 669) can be electrically isolated from one another and not electrically coupled. Although FIG. 6C illustrates splitting the column into two drive electrodes, in some examples, the column can be divided or otherwise split into more than two drive electrodes. Additionally although groups of four drive electrodes are illustrated, it should be understood that the groups can include fewer electrodes (e.g., 2 electrodes) or more electrodes (e.g., 8 electrodes, etc.).

As illustrated in FIG. 6C, in some examples, display data line 680 can be disposed beneath the column of split drive electrodes 661 and 666. It is understood that although one display data line 680 is illustrated, touch screen 660 can have one or more display data lines disposed beneath the columns of split drive electrodes (e.g., one or more display data lines under each column or one or more display data lines under one or more of columns of split drive electrodes 662 and 667, 663 and 668, and 664 and 669). In some examples, display data line 680 can be disposed above the column of split drive electrodes 661 and 666, or otherwise parallel to the column of split drive electrodes 661 and 666. In some examples, the display data line 680 can also be disposed beneath a portion of the one or more row electrodes. Other widths of display data line 680 are possible without departing from the scope of this disclosure. In some examples, display data line 680 can be separated from split drive electrodes 661 and 666 by one or more dielectric layers or a cathode layer). In some examples, the proximity of display data line 680 to the column of split drive electrodes 661 and 666 can introduce noise from the display data line (or other noise sources) into the column of split drive electrodes 661 and 666 (e.g., via capacitive or other parasitic coupling mechanism) and into rows of sense electrodes (e.g., directly or indirectly by perturbing the stimulation waveform on the drive electrodes which can be detected by the sense electrodes and translated into noise in the capacitance or change in capacitance measurements) when display data line 680 is updating or otherwise driving a display. In some examples, the noise introduced by display data line 680 can be common mode noise introduced into drive electrode 661 and into drive electrode 666. As described in more detail below, by splitting the column into split drive electrodes 661 and 666, the common mode noise injected by the display can be mitigated or reduced.

The column of drive electrodes and the rows of sense electrodes illustrated in FIG. 6C can be coupled to touch circuitry (e.g., touch controller 206) via a drive and/or sense interface (e.g., drive interface 324, sense interface 325 and/or drive/sense interface 425). In some examples, the column of drive electrodes can be coupled to transmit circuitry (e.g., transmit circuitry 214). In some examples, groups of multiple columns of drive electrodes can be coupled to a drive circuit configured to generate multi-stim drive signals for a bank. For example, FIG. 6C illustrates split drive electrodes 661, 662, 663, and 664 (of a first bank) coupled to drive circuit 682 and drive electrodes 666, 667, 668, and 669 (of a second bank) can be coupled to drive circuit 684. Although illustrated as two distinct circuits, it is understood that drive circuit 682 and drive circuit 684 can be integrated into a single drive circuit.

An exemplary method of stimulating and sensing the drive and sense electrodes, respectively, will now be described. For example, a mutual capacitance scan can generate a touch image for touch screen 660 during one simultaneous drive and sense phase (e.g., as opposed to two distinct phases described above with respect to FIG. 6A). In some examples, the drive electrodes in the first bank can be driven in a first set of steps (e.g., using a first set of coded stimulation signals) and a mutual capacitance or change in mutual capacitance between the drive electrodes of the first bank and one row of sense electrodes of the first bank (e.g., sense electrodes 670) can be measured. Concurrently with driving and sensing electrodes of the first bank, the drive electrodes in the second bank can be driven in a second set of steps (e.g., using a second, orthogonal set of coded stimulation signals) and a mutual capacitance or change in mutual capacitance between the drive electrodes of the second bank and a row of sense electrodes of the second bank (e.g., sense electrodes 671) can be measured. In some examples, sense circuit 686 (e.g., corresponding to receive circuitry 208) can sense split sense electrodes 670 and 671 (e.g., simultaneously or nearly simultaneously within a threshold period of time).

In some examples, the sensing of the mutual capacitance scan can measure capacitances of touch nodes of the first bank corresponding to sense electrode 670 that can include a touch signal indicative of an object touching or proximate (within a threshold distance) of touch screen 660 and can include noise injected by display data line 680 and coupled onto drive electrode 661. Similarly, the sensing of the mutual capacitance scan can measure capacitances of touch nodes of the second bank corresponding to sense electrode 671 that can include noise injected by display data line 680 and coupled onto sense electrode 671. In some examples, the noise detected by sense electrodes 670 and 671 from the display data line 680 can be the same (or similar, e.g., within a threshold voltage level). In some examples, sense electrodes 670 and 671 can be adjacent rows of sense electrodes. In some examples, other distances between the two rows of sense electrodes can be used. For example, the two rows can be a threshold distance apart to avoid unintentionally eliminating intentional touch measurements (e.g., a touch can cause the same or similar sense signal on multiple rows of sense electrodes which may be unintentionally identified as common mode noise and reduced or eliminated). In some examples, the noise detected by sense electrodes 670 and 671 coupled from the display data line 680 can be the same (or similar, e.g., within a threshold voltage level). In some example, interleaving split drive electrodes 661 and 666 can enable sensing adjacent rows of sense electrodes. In some examples, adjacent rows of sense electrodes (or rows which are a certain distance apart) can increase the correlation in the noise experienced by the two rows and thus result in better noise elimination or reduction by sense circuit 686. As described herein, this noise can be referred to as "common-mode noise" because the noise appears in the same (or similar) manner on both sense electrodes 670 and 671. In some examples, sense circuit 686 can subtract the signal from the second bank from the signal from the first bank (e.g., using single ended or differential circuitry illustrated in FIGS. 7A-7E). Because the second bank experiences the same (or similar) common mode noise as the first bank, subtracting the signal of the second bank (representative of noise) from the signal of the first bank (representative of the touch signal and noise) can eliminate or reduce the common mode noise.

As a result of the driving/sensing the first and second banks, and the subtraction of the common mode noise from capacitive measurements of the first and second bank, the resulting signals at the touch nodes of the first and second bank can capture a touch "image" of the first and second bank (corresponding to the column of split drive electrodes 661, 662, 663, 664, 666, 667, 668, and 669 and the two rows of sense electrodes 670 and 671) filtered for common mode noise. The same measurements and subtraction can be repeated for the rest of the rows (by sense circuits similar sense circuit 686) of the touch sensor panel of touch screen 660 (e.g., for row electrodes 672 and 673 and row electrodes 674 and 675) to form the touch image for touch screen 660 for further processing to identify and process touch input. It should be understood that although the differential measurements are shown between adjacent sense electrodes, that differential measurements between sense electrodes can be different in some examples (e.g., a differential measurement of sense electrodes separated by one or more other sense electrodes).

The above-described method of stimulating and sensing the drive and sense electrodes assumes that an object is touching or proximate to one of the two banks, but not both banks simultaneously. However, it is understood that in the scenario in which a plurality of objects is touching or proximate to both the first and second bank of electrodes, touch screen 660 can capture a touch "image" of the first and second bank, including measurement of the plurality of touching or proximate objects, filtered for common mode noise. For example, touch screen 660 can be stimulated using a multi-stimulation mutual capacitance scan, with different coded multi-stimulation signals applied to split drive lines in each bank. In some examples, drive circuit 682 can drive the first bank of four split drive electrodes according to a first multi-stimulation code and drive circuit 684 can drive the second bank of four split drive electrodes according to a second different, orthogonal multi-stimulation steps, shown above in Table 3.

In some examples, driving the two banks with different, orthogonal sets of coded multi-stimulation drive signals in eight scan steps can generate eight sensed signals (differential sensed signals). For each scan step, one sensed signal (including coded signal contributions from four drive lines (e.g., one charge on each of the four drive lines)) can be generated on the sense electrode for each respective bank. Thus, in some examples, the sensed signals for a first bank can be generated using unique multi-stim codes that are orthogonal to the unique multi-stim codes used for generating the sensed signals for the second bank. In some examples, because the sensed signals from the first bank are generated using orthogonal and unique stimulation signals different than used to for generating the sensed signals from the second bank, when sensed signals from the first bank and the second bank are combined (e.g., via a differential amplifier or other differential circuit), capacitive signals (e.g., indicative of touch) on a first bank can be orthogonal to and not conflict or interfere with capacitive signals (e.g., indicative of touch) on the second bank (e.g., by sense circuit 686 when performing common mode noise elimination or reduction). In some examples, the eight sensed signals can be processed by sense circuit 686 to identify the common mode noise components and eliminate or reduce the common mode noise to generate eight filtered sense signals (e.g., the common mode noise coupled onto the sense signals of both banks are not orthogonal and can be eliminated or reduced by the sense circuits). In some examples, a differential amplifier in sense circuit 686 can compare (e.g., combine) touch signals from the two banks (e.g., sense electrodes 670 and 671) and output a differential output which filters out the common mode noise experienced by both banks. In some examples, the eight filtered sensed signals can be decoded based on the stimulation phases to extract the capacitive signal for each touch node by one of the drive lines and the respective sense line. In some examples, a touch image for touch screen 660 can be generated using the decoded sense signals and can be further processed to identify and process the touch input. For example, equation (3) described above with reference to four drive line multi-stim example of FIG. 5, can be modified (assuming similar gain for the sense channels) and used for decoding the sense signal in a differential (eight drive lines) multi-stim example. The modification to equation (3) can include a difference in how the total charge is measured. In the four drive line multi-stim example, the total charge can be added at the sense line. For a differential multi-stim example, the total charge for the differential sense signal (e.g., the difference between sense electrodes 670 and 671), can be a difference between the total charge accumulated for the sense electrode of a first bank from the stimulus applied to the drive electrodes (total charge on sense electrode 670 from stimulation on drive electrodes 661-664) and the total charge accumulated for the sense electrode of the second bank from the stimulus applied to the drive electrodes (e.g., total charge on sense electrode 671 from stimulation on drive electrodes 666-669) during the first half of the stimulation steps. The total charge for the differential sense signal can be a difference between the total charge accumulated for the sense electrode of the second bank from the stimulus applied to the drive electrodes (total charge on sense electrode 671 from stimulation on drive electrodes 666-669) and the total charge accumulated for the sense electrode of the first bank from the stimulus applied to the drive electrodes (e.g., total charge on sense electrode 670 from stimulation on drive electrodes 661-664) during the second half of the stimulation steps. Because the negative input of the differential amplifier causes inversion, the results from the second half of the stimulation steps (for the second bank) can be inverted after applying the inverse stimulation matrix of equation (3). Additionally, although Table 3 does not account for the inversion of the differential amplifier, in some examples, the polarities of the stimulation signals can be inverted such that the results of the demodulation with the inverse stimulation matrix can have the proper polarities without having to invert the results for the second bank.

Figure 6D:
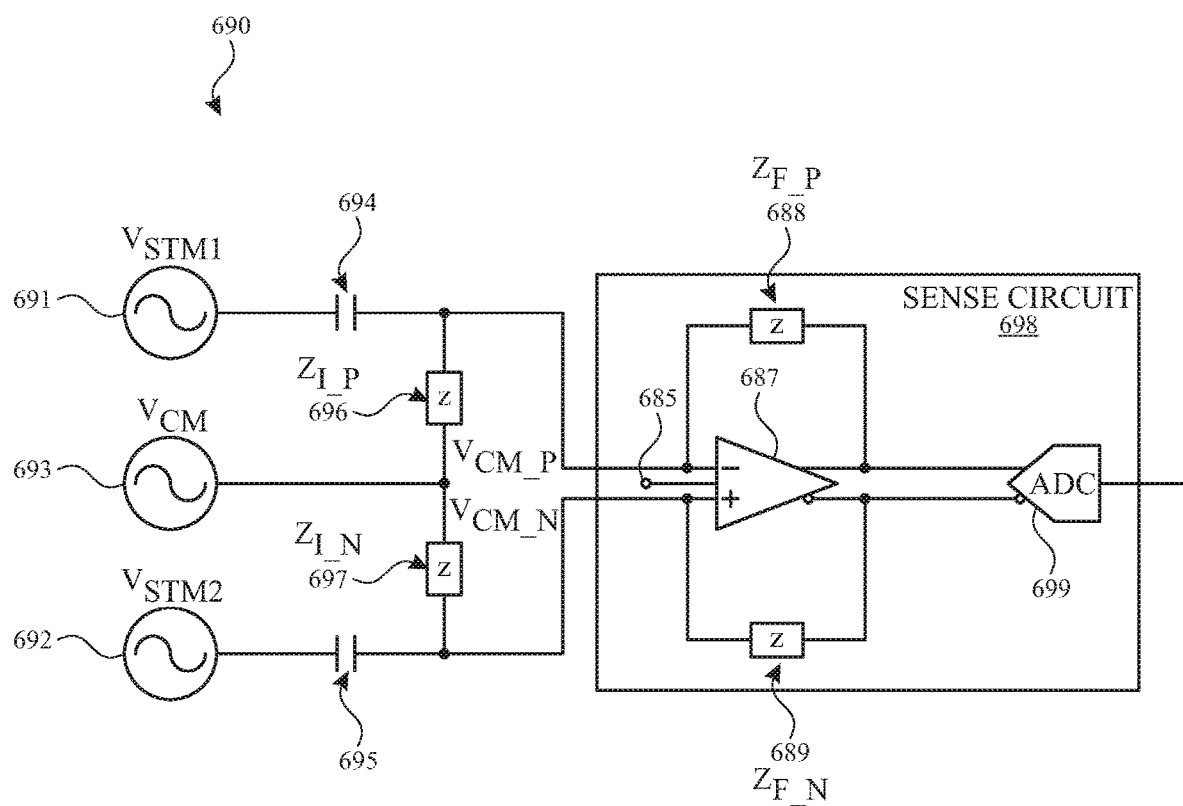

FIG. 6D illustrates an exemplary circuit model 690 of a touch screen according to examples of the disclosure. Signal sources $V_{STM1}$ 691 and $V_{STM2}$ 692 can represent the stimulation (e.g., drive) signals applied to two drive electrodes (e.g., from a first and second bank, respectively) and capacitors 694 and 695 can represent the mutual capacitance or change in capacitance between the stimulated drive electrode and the respective sense electrode (e.g., similar to Cm described above in FIG. 5). In some examples, noise source $V_{CM}$ 693 represents common mode noise introduced by one or more display data lines (e.g., routed underneath the electrodes). Using FIG. 6C as an example, the stimulation signal on drive electrode 661 can be represented as $V_{STM1}$ 691 and the drive signal on drive electrode 666 can be represented as $V_{STM2}$ 692. In some examples, capacitor 694 can represent the mutual capacitance (e.g., capacitance or change in capacitance) created between drive electrode 661 and sense electrode 670 (e.g., of the first bank) during a touch or proximity event and capacitor 697 can represent the mutual capacitance (e.g., capacitance or change in capacitance) created between drive electrode 666 and sense electrode 671 (e.g., of the second bank) during a touch or proximity event. In some examples, the common mode noise (e.g., generated by the display data lines or other noise sources) that capacitively couples onto the sense electrodes can be represented as $V_{CM}$ 693. As shown, impedance $Z_{I\_P}$ 696 and $Z_{I\_N}$ 697 can represent the impedance coupling (e.g., capacitive or otherwise) of the common mode noise onto the respective sense electrodes (e.g., from the display data lines to the cathode layer and from the cathode layer to the sense electrodes).

As shown in FIG. 6D, a common mode noise $V_{CM\_P}$ can be coupled onto the first sense electrode and common mode noise $V_{CM\_N}$ can be coupled onto the second sense electrode. In some examples, $V_{CM\_P}$ and $V_{CM\_N}$ can have the same (or similar) magnitude. In some examples, the first and second sense signal (e.g., including a touch event and/or common mode noise) can be coupled to sense circuit 698. In some examples, sense circuit 698 can include a fully differential sense amplifier 687. In some examples, fully differential sense amplifier 687 can have variable feedback impedance paths $Z_{F\_P}$ 688 and $Z_{F\_N}$ 689 between the inverting and noninverting inputs, respectively, and the respective differential output. In some examples, $Z_{F\_P}$ 688 and $Z_{F\_N}$ 689 can be variable impedances (e.g., comprising variable capacitors and/or variable resistors). In some examples, $Z_{F\_P}$ 688 and $Z_{F\_N}$ 696 can be adjusted to match the ratio of $Z_{I\_P}$ 696 and $Z_{I\_N}$ 697. In some examples, fully differential sense amplifier 687 can be coupled to a first sense signal on the inverting input and a second sense signal on the noninverting input. In some examples, fully differential sense amplifier 687 can receive a DC bias voltage 685. In some examples, the differential output of fully differential amplifier 687 can be coupled to differential ADC 699. In some examples, differential ADC 699 can further remove (e.g., eliminate or reduce) any remaining common mode noise, including common mode noise not fully removed by fully differential amplifier 687 and common mode noise coupled onto the sense signals by other sources or by the components of sense circuit 698. Thus, in some examples, the output of ADC 699 can be a digital signal representative of the capacitance or change in capacitance with the common mode noise eliminated or reduced. In some examples, the resulting signal output by ADC 699 can be processed (e.g., decoded, etc.) to detect touch and/or proximity input. In some examples, the resulting signal can be coupled to a processor (e.g., touch processors 202, touch controller 206 and/or host processor 228

In some examples, the gain of fully differential amplifier 687 can be controlled by variable impedances $Z_{F\_P}$ 688 and $Z_{F\_N}$ 689 and the capacitance experienced by the common mode signal when coupling onto the sense lines $Z_{I\_P}$ 696 and $Z_{I\_N}$ 697. Thus, the output of fully differential amplifier 687 (e.g., the differential output) can be modeled by the equation:

$$V_o = (V_{CM\_N} - V_{CM\_P}) * G \quad (4)$$

where $V_{CM\_N}$ can represent the common mode noise coupled onto the second sense signal, $V_{CM\_P}$ can represent the common mode noise coupled onto the first sense signal, and G can represent the gain of the fully differential amplifier 687. In some examples, when $Z_{F\_P}$ 688 and $Z_{F\_N}$ 696 is adjusted to match the ratio of $Z_{I\_P}$ 696 and $Z_{I\_N}$ 697, the gain of fully differential amplifier 687 can be modeled by the equation:

$$G = \frac{Z_{F\_P}}{Z_{I\_P}} = \frac{Z_{F\_N}}{Z_{I\_N}} \quad (5)$$

where $Z_{F\_P}$ can represent the impedance of feedback path $Z_{F\_P}$ 688, $Z_{I\_P}$ can represent the capacitance experienced by common mode signal $Z_{I\_P}$ 696, $Z_{F\_N}$ can represent the impedance of feedback path $Z_{F\_N}$ 689, and $Z_{I\_N}$ can represent the capacitance experienced by common mode signal $Z_{I\_N}$ 697. Thus, in some examples, when $V_{CM\_N}$ and $V_{CM\_P}$ have the same magnitude, fully differential amplifier 687 can eliminate (or minimize) the common mode noise coupled onto the sense lines. In some examples, when $V_{CM\_N}$ and $V_{CM\_P}$ are not equal, but have similar magnitudes, fully differential amplifier 687 can attenuate (e.g., reduce or otherwise mitigate) the common mode noise.

In some examples, sense circuit 698 can be the same or similar to sense circuits 626, 656, and 686 and the sense circuit 698 can be implemented in any of sense circuits 626, 656, and 686. Although sense circuit 698 is depicted with a particular sense circuit implementation, it is understood that sense circuit 698 can be implemented using any of sense circuits 700, 720, 740, 760, or 780.

Figure 7A:
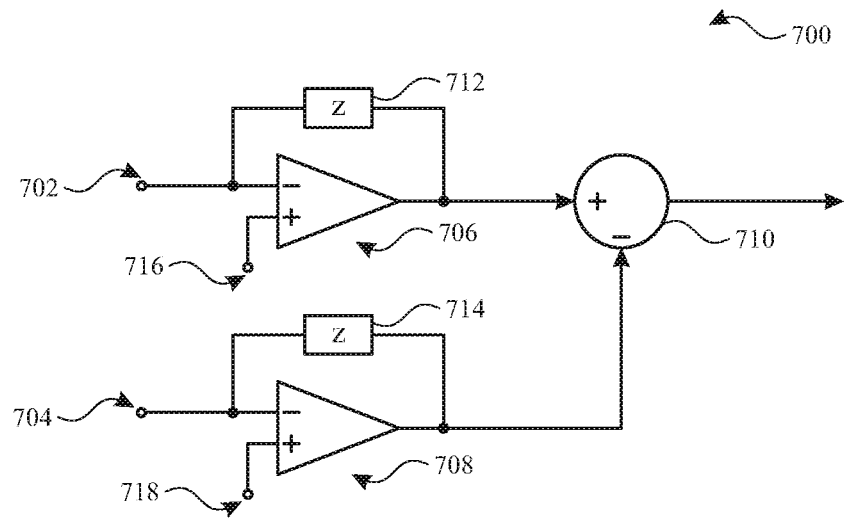
FIGS. 7A-7E illustrate example sense circuits to eliminate or reduce common mode noise according to examples of the disclosure.

FIGS. 7A-7E illustrate example sense circuits to eliminate or reduce common mode noise according to examples of the disclosure. FIG. 7A illustrates an example sense circuit 700 including single-ended sense amplifiers 706 and 708, and summing circuit 710 according to examples of the disclosure. In some examples, single-ended sense amplifier 706 (e.g., the inverting input) can be coupled to a first split sense electrode 702 (e.g., sense electrode 602) and single-ended sense amplifier 708 (e.g., the inverting input) can be coupled to a second split sense electrode 704 (e.g., sense electrode 604). The non-inverting inputs of single-ended sense amplifiers 706 and 708 can be coupled to a DC bias voltage. Single-ended sense amplifiers 706 and 708 can have feedback network 712 and 714, respectively, coupled between the output of the sense amplifiers and the inverting input of the sense amplifiers. In some examples, feedback networks 712 and 714 can control the gain of single-ended sense amplifiers 706 and 708. In some examples the feedback networks 712 and 714 can each include a resistor and/or a capacitor (e.g., with a variable resistance and/or variable capacitance) in parallel or otherwise. Thus, in some examples, feedback networks 712 and 714 can have variable impedances. Summing circuit 710 can be coupled to the output of single-ended sense amplifiers 706 and 708. In some examples, the output of single-ended sense amplifier 706 can be coupled to the positive input of summing circuit 710 and the output of single-ended sense amplifier 708 can be coupled to the negative input of summing circuit 710. In some examples, summing circuit 710 can comprise an analog summing circuit (e.g., the circuit adds or subtracts the analog voltage or current levels of the inputs). In some examples, summing circuit 710 can comprise analog-to-digital converters to convert the two analog inputs to digital values and a digital summer to add or subtract the digital values. These and other suitable circuits to achieve the summing functionality are contemplated by this disclosure. Thus, summing circuit 710 can subtract the signal from the negative input (e.g., the output of single-ended sense amplifier 708) from the signal from the positive input (e.g., the output of single-ended sense amplifier 706). In such an example, because the signals from the positive input and negative input both contain the same or similar common mode noise component, subtracting the two signals can result in a signal with no or a reduced amount of common mode noise. Thus, in some examples, the output of summing circuit 710 can be a signal representative of the capacitance or change in capacitance with the common mode noise eliminated or reduced. In some examples, the resulting signal output by summing circuit 710 can be processed (e.g., decoded, etc.) to detect touch and/or proximity input. In some examples, the resulting signal can be coupled to a processor (e.g., touch processors 202, touch controller 206 and/or host processor 228).

It is understood that sense circuit 700 can be implemented in any of sense circuits 626, 656, 686, and 698 described above with respect to FIGS. 6A-6D. For example, in the exemplary method of stimulating and sensing the drive and sense electrodes described in FIG. 6A, sense circuit 700 can operate as described during the first phase of a mutual capacitance scan. In such examples, the output of summing circuit 710 can be a signal representative of the capacitance or change in capacitance of the sense electrode of the first bank. During the second phase of a mutual capacitance scan, the inputs to single-ended sense amplifier 706 and 708 can be reversed (e.g., via switching circuitry, such as a multiplexer, not shown). For example, single-ended amplifier 706 can be switched to be coupled to second split sense electrode 704 (e.g., corresponding to sense electrode 604) and single-ended amplifier 708 can be switched to be coupled to first split sense electrode 702 (e.g., corresponding to sense electrode 602). Thus, the output of summing circuit 710 can be a signal representative of the capacitance or change in capacitance of the sense electrode of the second bank. In some examples, instead of reversing the inputs to single-ended sense amplifiers 706 and 708, the inputs of the summing circuit 710 can be reversed to achieve the same effect. For example, the positive input of summing circuit 710 can be switched (e.g., via switching circuitry, such as a multiplexer, not shown) to couple to the output of single-ended sense amplifier 708 and the negative input of summing circuit 710 can be switched (e.g., via switching circuitry, such as a multiplexer, not shown) to couple to the output of single-ended sense amplifier 706. Thus, the output of summing circuit 710 can be a signal representative of representative of the capacitance or change in capacitance of the sense electrode of the second bank.

Figure 7B:
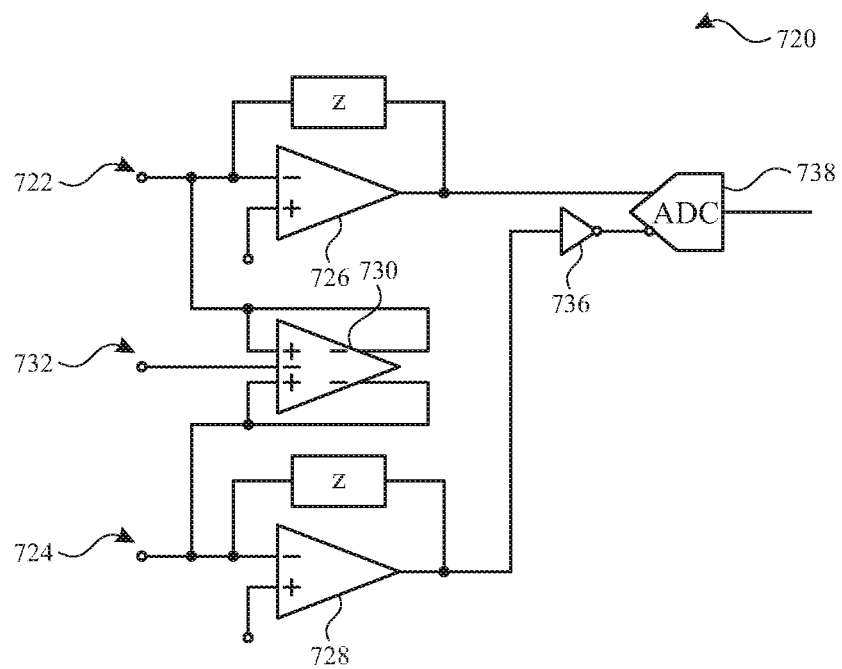

FIG. 7B illustrates an example sense circuit 720 including single-ended sense amplifiers 726 and 728, and common mode amplifier 730 according to examples of the disclosure. In some examples, common mode amplifier 730 can be an amplifier with two noninverting inputs, one inverting input, and two inverting outputs. In some examples, the inverting input of common mode amplifier 730 can be coupled to a common mode DC bias voltage 732. In some examples, common mode amplifier 730 can be coupled to a first split sense electrode 722 (e.g., sense electrode 602) at a first noninverting input and a second split sense electrode 724 (e.g., sense electrode 604) at a second noninverting input. In some examples, the two inverting outputs of common mode amplifier 730 can be coupled to the noninverting inputs and act as a feedback loop to common mode amplifier 730. In some examples, in response to the inputs on the noninverting input, common mode amplifier 730 can output current on the inverting outputs that have an equal (or similar) but opposite magnitude as the common mode noise component on the noninverting inputs. Thus, in some examples, the outputs of common mode amplifier 730, coupled to first split sense electrode 722 and second split sense electrode 724 (e.g., as a feedback mechanism), can remove, eliminate, or reduce the common mode noise from first split sense electrode 722 and second split sense electrode 724. Thus, first split sense electrode 722 and second split sense electrode 724 can appear to other circuit components (such as single-ended sense amplifiers 726 and 728) as signals representative of the capacitance or change in capacitance with the common mode noise eliminated or reduced. In some examples, common mode amplifier 730 can improve common mode rejection (e.g., elimination or mitigation) compared to using the differential subtraction of common mode noise output by single-ended amplifiers 726 and 728. In some examples, common mode amplifier 730 can improve the dynamic range of the single-ended sense amplifiers 722 and 724 due to eliminating or reducing the common mode noise component before the single-ended sense amplifiers amplify the signals from the touch electrodes.

In some examples, single-ended sense amplifier 726 (e.g., the inverting input) can be coupled to a first split sense electrode 722 (e.g., sense electrode 602) and single-ended sense amplifier 728 (e.g., the inverting input) can be coupled to a second split sense electrode 724 (e.g., sense electrode 604). The non-inverting inputs of single-ended sense amplifiers 726 and 728 can be coupled to a DC bias voltage. Single-ended sense amplifiers 726 and 728 can have feedback networks, coupled between the output of the sense amplifiers and the inverting input of the sense amplifiers (e.g., similarly to feedback networks 712 and 714). In some examples, the feedback networks can control the gain of single-ended sense amplifiers 726 and 728. In some examples the feedback networks and can each include a resistor and/or a capacitor (e.g., with a variable resistance and/or variable capacitance) in parallel or otherwise. Thus, in some examples, the feedback networks can have variable impedances. Thus, because first split sense electrode 722 and second split sense electrode 724 can have the common mode noise component eliminated or reduced (e.g., by common mode amplifier 730), the output of single-ended sense amplifiers 726 and 728 can be a signal representative of the capacitance or change in capacitance with the common mode noise eliminated or reduced. In some examples, the output of single-ended sense amplifiers 726 and 728 can be coupled to a differential analog-to-digital converter (ADC) 738. In some examples, the output of single-ended sense amplifier 728 can be inverted by inverter 736 before coupling to differential ADC 738 to handle the single-ended to differential conversion for differential ADC 738. In some examples, the inputs to differential ADC 738 can be noninverting inputs. In some examples, inverter 736 can be a noninverting buffer and the input of differential ADC 738 to which inverter 736 is coupled can be an inverting input. In some examples, differential ADC 738 can further remove (e.g., eliminate or reduce) any remaining common mode noise, including common mode noise not fully removed by common mode amplifier 730 and common mode noise coupled onto the sense signals by other sources or by the components of sense circuit 720. Thus, in some examples, the output of ADC 738 can be a digital signal representative of the capacitance or change in capacitance with the common mode noise eliminated or reduced. In some examples, the resulting signal output by ADC 738 can be processed (e.g., decoded, etc.) to detect touch and/or proximity input. In some examples, the resulting signal can be coupled to a processor (e.g., touch processors 202, touch controller 206 and/or host processor 228.

It is understood that sense circuit 720 can be implemented in any of sense circuits 626, 656, 686, and 698 described above with respect to FIGS. 6A-6D. For example, in the exemplary method of stimulating and sensing the drive and sense electrodes described in FIG. 6A, sense circuit 720 can operate as described during the first phase of a mutual capacitance scan. In such examples, the output of ADC 738 can be a digital signal representative of the capacitance or change in capacitance of the sense electrode of the first bank. During the second phase of a mutual capacitance scan, the inputs to single-ended sense amplifier 706 and 708 and common mode amplifier 730 can be reversed (e.g., via switching circuitry, such as a multiplexer, not shown). For example, single-ended amplifier 726 can be switched to be coupled to second split sense electrode 724 (e.g., corresponding to sense electrode 604), single-ended amplifier 728 can be switched to be coupled to first split sense electrode 722 (e.g., corresponding to sense electrode 602), the inverting input of common mode amplifier 730 can be switched to be coupled to second split sense electrode 724, and the noninverting input of common mode amplifier 730 can be switched to be coupled to first split sense electrode 722. Thus, the output of ADC 738 can be a digital signal representative of the capacitance or change in capacitance of the sense electrode of the second bank. In some examples, instead of reversing the inputs to single-ended sense amplifiers 726 and 728 and common mode amplifier 730, the inputs of ADC 738 can be reversed to achieve the same effect. In some examples rather than changing the couplings of the circuit, the polarity of the digital output of differential ADC 738 can be reversed (e.g., the output of ADC 738 can be signed and reversing the polarity can comprise inverting the sign bit of ADC 738).

Figure 7C:
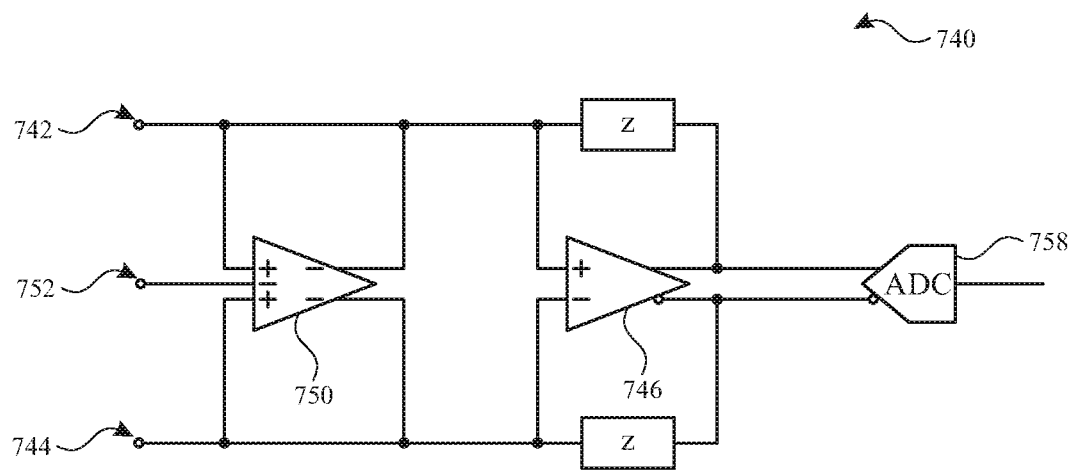

FIG. 7C illustrates an example sense circuit 740 including fully differential sense amplifier 746 and common mode amplifier 750 according to examples of the disclosure. In some examples, common mode amplifier 750 can be an amplifier with two noninverting inputs, one inverting input, and two inverting outputs. In some examples, the inverting input of common mode amplifier 750 can be coupled to a common mode DC bias voltage 752. In some examples, common mode amplifier 750 can be coupled to a first split sense electrode 742 (e.g., sense electrode 602) at a first noninverting input and a second split sense electrode 744 (e.g., sense electrode 604) at a second noninverting input. In some examples, the two inverting outputs of common mode amplifier 750 can be coupled to the noninverting inputs and act as a feedback loop to common mode amplifier 750. In some examples, in response to the inputs on the noninverting input, common mode amplifier 750 can output current on the inverting outputs that have an equal (or similar) but opposite magnitude as the common mode noise component on the noninverting inputs. Thus, in some examples, the outputs of common mode amplifier 750, coupled to first split sense electrode 742 and second split sense electrode 744 (e.g., as a feedback mechanism), can remove, eliminate, or reduce the common mode noise from first split sense electrode 742 and second split sense electrode 744. Thus, first split sense electrode 742 and second split sense electrode 744 can appear to other circuit components (such as differential sense amplifier 746) as signals representative of the capacitance or change in capacitance with the common mode noise eliminated or reduced. In some examples, common mode amplifier 750 can improve common mode rejection (e.g., elimination or mitigation) as compared to using differential subtraction by differential sense amplifier 746 to eliminate or mitigate the common mode noise. In some examples, common mode amplifier 750 can improve the dynamic range of the differential sense amplifier 746 due to eliminating or reducing the common mode noise component before differential sense amplifier 746 amplifies the signals from the touch electrodes.

In some examples, fully differential sense amplifier 746 can be coupled to first split sense electrode 742 (e.g., sense electrode 602) at the inverting input and to second split sense electrode 744 (e.g., sense electrode 604) at the non-inverting input. Fully differential sense amplifier 746 can have a feedback network coupled between the output of differential sense amplifiers 746 and the inverting input of fully differential sense amplifier 746 and a feedback network coupled between the output of fully differential sense amplifier 746 and the noninverting input of fully differential sense amplifier 746. In some examples, the feedback network can control the gain of fully differential sense amplifier 746. In some examples the feedback network can each include a resistor and/or a capacitor (e.g., with a variable resistance and/or variable capacitance) in parallel or otherwise. Thus, in some examples, the feedback networks can have variable impedances. Thus, because first split sense electrode 742 and second split sense electrode 744 can have the common mode noise component eliminated or reduced (e.g., by common mode amplifier 750), the output of differential sense amplifier 746 can be a signal representative of the capacitance or change in capacitance with the common mode noise eliminated or reduced. In some examples, the output of fully differential sense amplifier 746 can be a differential output coupled to a differential analog-to-digital converter (ADC) 758. In some examples, differential ADC 758 can further remove (e.g., eliminate or reduce) any remaining common mode noise, including common mode noise not fully removed by common mode amplifier 750 and common mode noise coupled onto the sense signals by other sources or by the components of sense circuit 740. Thus, in some examples, the output of ADC 758 can be a digital signal representative of the capacitance or change in capacitance with the common mode noise eliminated or reduced. In some examples, the resulting signal output by ADC 758 can be processed (e.g., decoded, etc.) to detect touch and/or proximity input. In some examples, the resulting signal can be coupled to a processor (e.g., touch processors 202, touch controller 206 and/or host processor 228.

It is understood that sense circuit 740 can be implemented in any of sense circuits 626, 656, 686, and 698 described above with respect to FIGS. 6A-6D. For example, in the exemplary method of stimulating and sensing the drive and sense electrodes described in FIG. 6A, sense circuit 740 can operate as described during the first phase of a mutual capacitance scan. In such examples, the output of ADC 758 can be a digital signal representative of the capacitance or change in capacitance of the sense electrode of the first bank. During the second phase of a mutual capacitance scan, the inputs to differential sense amplifier 746 and common mode amplifier 750 can be reversed (e.g., via switching circuitry, such as a multiplexer, not shown). For example, the inverting input of differential amplifier 746 can be switched to be coupled to second split sense electrode 744 (e.g., corresponding to sense electrode 604), the noninverting input of differential amplifier 746 can be switched to be coupled to first split sense electrode 742 (e.g., corresponding to sense electrode 602), the inverting input of common mode amplifier 750 can be switched to be coupled to second split sense electrode 744, and the noninverting input of common mode amplifier 750 can be switched to be coupled to first split sense electrode 742. Thus, the output of ADC 758 can be a digital signal representative of the capacitance or change in capacitance of the sense electrode of the second bank. In some examples, instead of reversing the inputs to differential sense amplifier 746 and common mode amplifier 750, the inputs of ADC 758 can be reversed to achieve the same effect. In some examples rather than changing the couplings of the circuit, the polarity of the digital output of differential ADC 758 can be reversed (e.g., the output of ADC 718 can be signed and reversing the polarity can comprise inverting the sign bit of ADC 758).

Figure 7D:
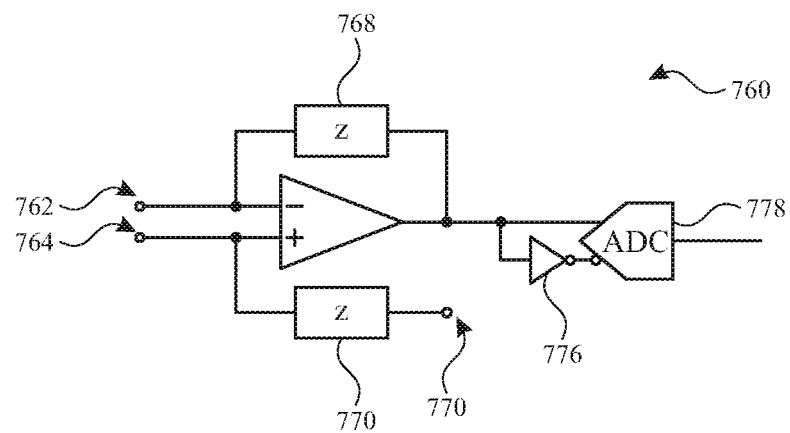

FIG. 7D illustrates an example sense circuit 760 including differential-to-single-ended sense amplifier 766 according to examples of the disclosure. In some examples, differential-to-single-ended amplifier 766 can be coupled to a first split sense electrode 762 (e.g., sense electrode 602) at the inverting input and a second split sense electrode 764 (e.g., sense electrode 604) at the noninverting input. Differential-to-single-ended sense amplifier 766 can have a feedback network 768 coupled between the output of differential-to-single-ended sense amplifier 766 and the inverting input of differential-to-single-ended sense amplifier 766. In some examples, impedance 770 can be coupled to the noninverting input of differential-to-single-ended sense amplifier 766 and be driven by a DC bias voltage 772. In some examples, feedback network 768 can control the gain of differential-to-single-ended sense amplifier 766. In some examples feedback network 768 and impedance 770 can each include a resistor and/or a capacitor (e.g., with a variable resistance and/or variable capacitance) in parallel or otherwise. Thus, in some examples, the feedback network 768 and impedance 770 can have variable impedances. In some examples, differential-to-single-ended amplifier 766 can subtract the signal from the inverting input (e.g., first split sense electrode 762) from the noninverting input (e.g., second split sense electrode 764). In such an example, because the signals from the noninverting input and inverting input both contain the same or similar common mode noise component, subtracting the two signals can result in a signal with no or a reduced amount of common mode noise. In some examples, the output of differential-to-single-ended sense amplifier 766 can be a single-ended output coupled to a differential analog-to-digital converter (ADC) 778. In some examples, the single-ended output of differential-to-single-ended sense amplifier 766 can be inverted by inverter 776 before coupling to differential ADC 778 to handle the single-ended to differential conversion for subtraction (and to amplify the signal). In some examples, the inputs to differential ADC 778 can be non-inverting inputs. In some examples, inverter 776 can be a noninverting buffer and the input of differential ADC 778 to which inverter 776 is coupled can be an inverting input. In some examples, differential ADC 778 can further remove (e.g., eliminate or reduce) any remaining common mode noise, including common mode noise not fully removed by differential sense amplifier 766 and common mode noise coupled onto the sense signals by other sources or by the components of sense circuit 760. Thus, in some examples, the output of ADC 778 can be a digital signal representative of the capacitance or change in capacitance with the common mode noise eliminated or reduced. In some examples, the resulting signal output by ADC 778 can be processed (e.g., decoded, etc.) to detect touch and/or proximity input. In some examples, the resulting signal can be coupled to a processor (e.g., touch processors 202, touch controller 206 and/or host processor 228. Although a differential amplifier 766 is illustrated with a single-ended output, in some examples, differential amplifier 766 can have a differential output that can be coupled to differential ADC 778.

It is understood that sense circuit 760 can be implemented in any of sense circuits 626, 656, 686, and 698 described above with respect to FIGS. 6A-6D. For example, in the exemplary method of stimulating and sensing the drive and sense electrodes described in FIG. 6A, sense circuit 760 can operate as described during the first phase of a mutual capacitance scan. In such examples, the output of ADC 778 can be a digital signal representative of the capacitance or change in capacitance of the sense electrode of the first bank. During the second phase of a mutual capacitance scan, the inputs to differential sense amplifier 746 can be reversed (e.g., via switching circuitry, such as a multiplexer, not shown). For example, the inverting input of differential amplifier 766 can be switched to be coupled to second split sense electrode 764 (e.g., corresponding to sense electrode 604) and the noninverting input of differential amplifier 766 can be switched to be coupled to first split sense electrode 762 (e.g., corresponding to sense electrode 602). Thus, the output of ADC 778 can be a digital signal representative of the capacitance or change in capacitance of the sense electrode of the second bank. In some examples, instead of reversing the inputs to differential sense amplifier 766, the inputs of ADC 778 can be reversed to achieve the same effect. In some examples rather than changing the couplings of the circuit, the polarity of the digital output of differential ADC 778 can be reversed (e.g., the output of ADC 778 can be signed and reversing the polarity can comprise inverting the sign bit of ADC 778).

As described herein, in some examples, the touch controller 206 can be configured for different types of sensing scans. For example, as illustrated in FIG. 5, the touch sensor panel can be configured for row-column mutual capacitance scans by coupling each sense line to a sense amplifier of a corresponding sense channel. In some examples, the sense amplifiers can be configured for use in differential mutual capacitance scans. For example, the sense electrode can be split and each split sense electrode can be coupled to a sense amplifier of a corresponding sense channel. In some examples, the sense amplifier from two channels can be configured to perform the differential measurement. In such examples, the differential measurements can be performed using single-ended sense amplifiers without requiring dedicated differential amplifiers for differential sensing measurements.

Figure 7E:
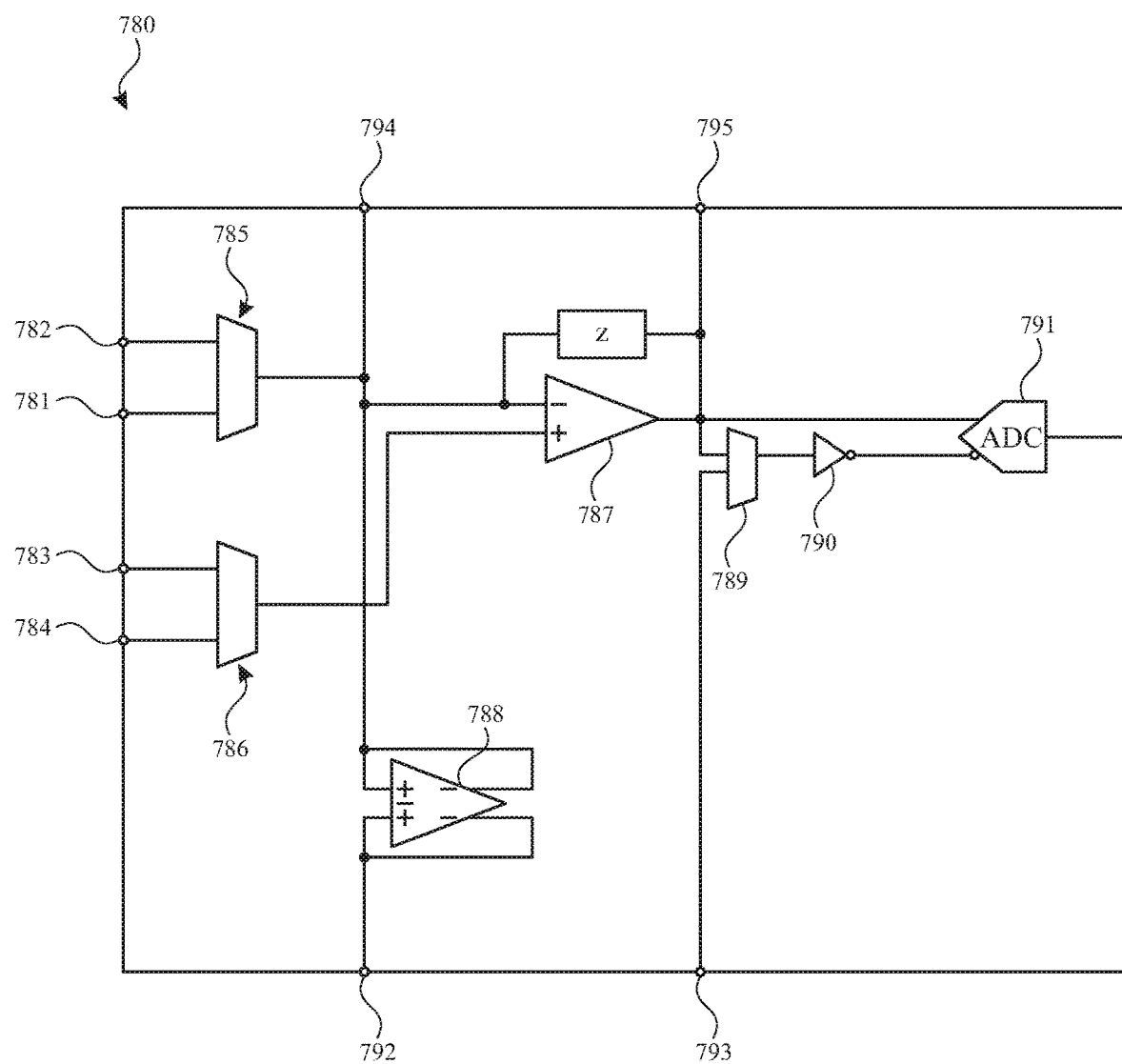

FIG. 7E illustrates an exemplary configurable sense channel 780 according to examples of the disclosure. Sense channel 780 can include sense amplifier 787. In some examples, sense amplifier 787 can include a feedback network coupled between the output of sense amplifier 787 and the inverting input of sense amplifier 787 to control the gain of sense amplifier 787. Sense amplifier can be used for single-ended or differential mutual capacitance sensing and for single-ended self-capacitance sensing. The inverting input of sense amplifier 787 can be coupled to multiplexer 785 and the noninverting input of sense amplifier 787 can be coupled to multiplexer 786. In some examples, multiplexer 785 can selectively couple node 782 (e.g., a row electrode, or split row electrode) or node 781 (e.g., a column electrode or split column electrode) to the inverting input of sense amplifier 787. For example, in a single-ended mutual capacitance scan or a single-ended self-capacitance scan one sense electrode can be coupled to the non-inverting input of sense amplifier 787. Multiplexer 786 can selectively couple node 783 (DC bias voltage) or node 784 (Vstim_SC) to the noninverting input of sense amplifier 787. For a mutual capacitance scan, node 783 can form a virtual ground node for mutual capacitance sensing. For a self-capacitance scan, node 784 can apply a self-capacitance stimulus to stimulate the sense electrode coupled to the inverting input of sense amplifier 787. In the single-ended configurations, the output of sense amplifier 787 can be coupled an ADC 791. In some examples, ADC 791 can be a differential ADC and the output of sense amplifier 787 can be inverted by inverter 790 and coupled to ADC 791 (e.g., via multiplexer 789).

In some examples, sense channel 780 can be configured for differential mutual capacitance measurements. In particular, two of sense channels 780 can be used together to form the differential measurement circuit illustrated in FIG. 7B. In the differential mutual capacitance scan configuration, sense amplifier 787 can be configured as above for a single-ended mutual capacitance scan. Namely, multiplexer 785 can couple one split sense electrode (e.g., in the configuration of FIG. 6A) or one sense electrode (e.g., in the configuration of FIGS. 6B-6C) to the non-inverting input, and provide a DC bias/virtual ground for the non-inverting input via multiplexer 786. This sense amplifier configuration can correspond to the configuration of sense amplifier 726 in FIG. 7B. Sense channel 780 can also be configured to couple with a second sense channel (not shown) with similar or the same circuitry. For example, a second sense channel can include a sense amplifier and can be configured in a similar manner as sense amplifier 728 in the configuration of FIG. 7B (e.g., by coupling the split or non-split sense electrode to the inverting input, DC biasing the non-inverting input as a virtual ground). The output of the sense amplifier of the second sense channel can be coupled to node 793 of sense channel 780 (e.g., from the node corresponding to 795 of the second sense channel). In the differential mutual capacitance scan, multiplexer 789 can couple the output of the second sense channel to inverter 790. Thus, ADC 791 can perform a differential measurement on the outputs of two single-ended amplifiers in a similar manner as described herein for FIGS. 7A and 7B.

In some examples, configurable sense channel 780 can include a common mode amplifier 788. In some examples, common mode amplifier 788 can be an amplifier with two noninverting inputs, one inverting input, and two inverting outputs. In some examples, the inverting input of common mode amplifier 788 can be coupled to a common mode DC bias voltage (not shown). A first noninverting input of common mode amplifier 788 can be coupled to the inverting input of sense amplifier 787. A second noninverting input of common mode amplifier 788 can be coupled to the non-inverting input of the sense amplifier of the second sense channel via node 792 of sense channel 780 (e.g., from the node corresponding to 794 of the second sense channel). In some examples, the two inverting outputs of common mode amplifier 788 can be coupled to the noninverting inputs and act as a feedback loop to common mode amplifier 788 as described above. In some examples, some sense channels can include the common mode amplifier 788 and other sense channels can omit common mode amplifier 788 because only one common mode amplifier may be required for two sense amplifiers for a differential measurement. Reducing the number of common mode amplifiers in the touch controller can reduce power consumption of the device.

Figure 8:
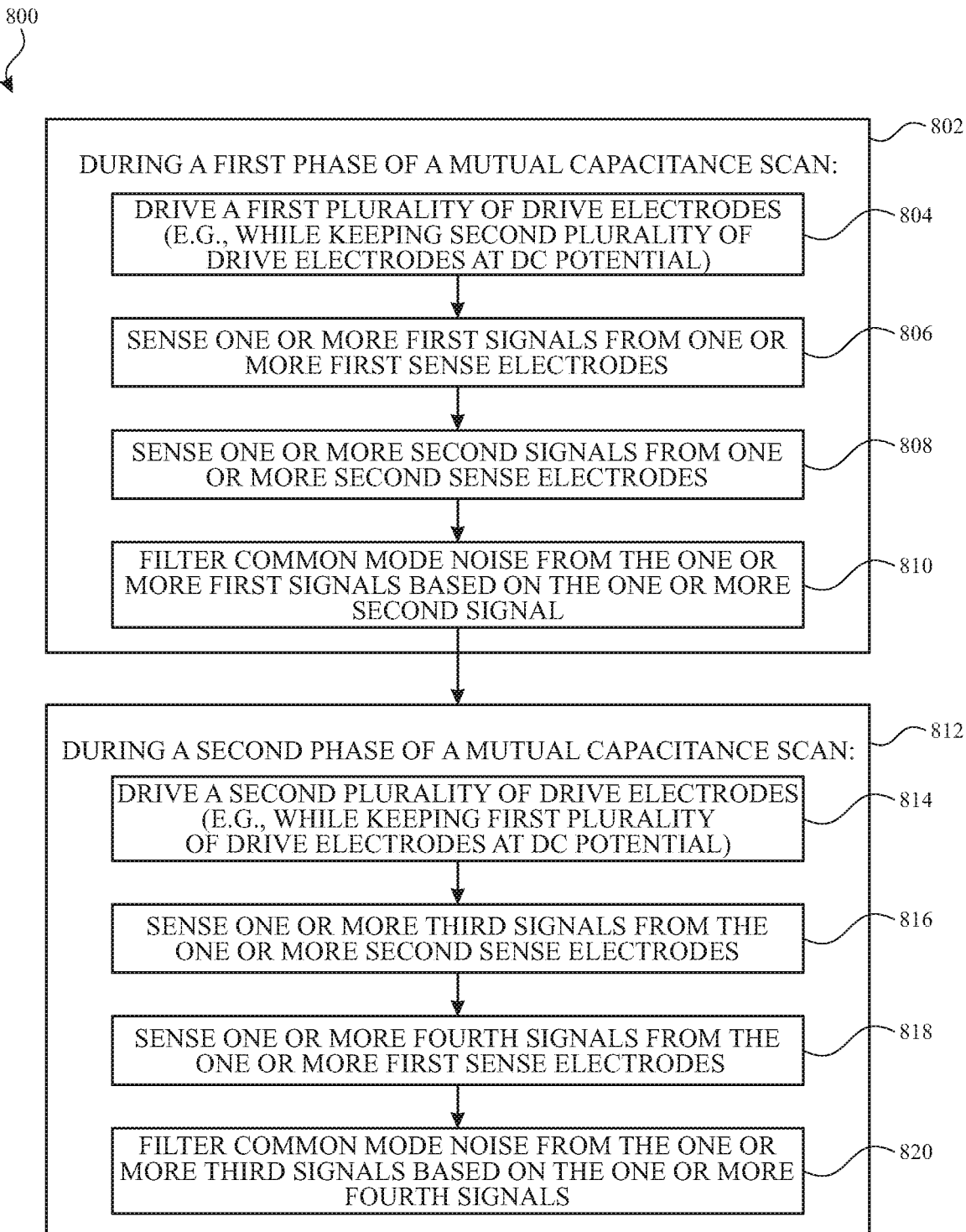
FIG. 8 illustrates an example process to eliminate or reduce common mode noise according to examples of the disclosure.

FIG. 8 illustrates an exemplary process 800 to eliminate or reduce common mode noise according to examples of the disclosure. Process 800 can correspond to the configuration of FIG. 6A. At 802, a first phase of a mutual capacitance scan can be performed. In some examples, the first phase of the mutual capacitance scan can include one or more of 804, 806, 808 and 810. At 804, a first plurality of drive electrodes can be driven (e.g., driven in a first set of steps). As explained above with respect to FIG. 6A, in some examples, the first plurality of drive electrodes can be a first group of split drive electrodes (e.g., from first bank 628, 658). In some examples, while the first plurality of drive electrodes is driven, a second plurality of drive electrodes can be kept at a DC potential (e.g., grounded, driven with a DC signal, or otherwise undriven). At 806, one of more first signals can be sensed from one or more first sense electrodes. In some examples, the first sense electrodes can be sense electrodes from a first bank (e.g., 628, 658). In some examples, the one or more first signals can include a touch signal indicative of an object touching or proximate (within a threshold distance) of the touch screen and can include common mode noise injected by a display data line (or other noise sources) and coupled onto sense electrode. At 808, one or more second signals can be sensed from one or more second sense electrodes. In some examples, the second sense electrodes can be sense electrodes from a second bank (e.g., 629, 659). In some examples, the one or more second signals can include common mode noise injected by the display data line (or other noise sources) and coupled onto the sense electrodes. In some examples, the common mode noise sensed on the one or more second signals is the same or similar to the common mode noise sensed on the one or more first signals. In some examples, the one or more second signals does not include a tough signal (e.g., because drive electrodes of the second bank are undriven). In some examples, 804 and 806 can be performed concurrently. In some examples, 806 can be performed before 808. In some examples, 808 can be performed before 806. At 810, common mode noise can be filtered from the one or more first signals based on the one or more second signals. In some examples, filtering common mode noise can involve subtracting the one or more second signals from the one or more first signals (e.g., by summing circuit 710). In some examples, filtering common mode noise can involve removing or eliminating the common mode noise using a common mode amplifier (such as common mode amplifier 730 and 750). In some examples, filtering common mode noise can involve removing or eliminating the common mode noise using a differential amplifier (such as differential amplifier 766) or a differential ADC (such as ADC 738, 758, 778).

At 812, a second phase of a mutual capacitance scan can be performed. In some examples, the second phase of the mutual capacitance scan can include one or more of 814, 816, 818 and 820. At 814, a second plurality of drive electrodes can be driven (e.g., driven in a second set of steps). As explained above with respect to FIG. 6A, in some examples, the second plurality of drive electrodes can be a second group of split drive electrodes (e.g., from second bank 629, 659). In some examples, while the second plurality of drive electrodes is driven, a first plurality of drive electrodes can be kept at a DC potential (e.g., grounded, driven with a DC signal, or otherwise undriven). At 816, one of more third signals can be sensed from one or more second sense electrodes. In some examples, the second sense electrodes can be sense electrodes from a second bank (e.g., 629, 659). In some examples, the one or more third signals can include a touch signal indicative of an object touching or proximate (within a threshold distance) of the touch screen and can include common mode noise injected by a display data line (or other noise sources) and coupled onto sense electrode. At 818, one or more fourth signals can be sensed from one or more first sense electrodes. In some examples, the first sense electrodes can be sense electrodes from a first bank (e.g., 628, 658). In some examples, the one or more fourth signals can include common mode noise injected by the display data line (or other noise sources) and coupled onto the sense electrodes. In some examples, the common mode noise sensed on the one or more fourth signals is the same or similar to the common mode noise sensed on the one or more third signals. In some examples, the one or more fourth signals does not include a tough signal (e.g., because drive electrodes of the first bank are undriven). In some examples, 814 and 816 can be performed concurrently. In some examples, 816 can be performed before 818. In some examples, 818 can be performed before 816. At 820, common mode noise can be filtered from the one or more third signals based on the one or more fourth signals. In some examples, filtering common mode noise can involve subtracting the one or more fourth signals from the one or more third signals (e.g., by summing circuit 710). In some examples, filtering common mode noise can involve removing or eliminating the common mode noise using a common mode amplifier (such as common mode amplifier 730 and 750). In some examples, filtering common mode noise can involve removing or eliminating the common mode noise using a differential amplifier (such as differential amplifier 766) or a differential ADC (such as ADC 738, 758, 778).

Although the disclosed examples have been fully described with reference to mutual capacitance based touch sensor panels (e.g., row-column or pixelated), it is to be understood that common mode noise correction techniques described herein can be applied to other touch sensor panels including other types of capacitive based touch sensor panels (e.g., self-capacitance based), resistive touch sensor panels, or the like. It is apparent to those skilled in the art that for different sensing technologies, modifications would be made to accommodate the sensing technology. For example, for a resistive touch sensor panel, the sensor nodes can be implemented with resistive sensors and the reference nodes can be implemented with resistive references sensors.

Therefore, according to the above, some examples of the disclosure are directed to a device. In some examples, the device can comprise drive circuitry configured to stimulate drive electrodes of a touch sensor panel; sense circuitry configured to receive sense signals from sense electrodes of the touch sensor panel; and logic circuitry coupled to the drive circuitry and the sense circuitry, configured to: during a first phase of a mutual capacitance scan of the touch sensor panel: simultaneously driving a first plurality of drive electrodes; sensing one or more first sense signals from one or more first sense electrodes, wherein the one or more first sense signals includes a first touch signal and a first common mode noise signal; sensing one or more second sense signals from one or more second sense electrodes, wherein the one or more second sense signals includes a second common mode noise signal; and filtering the first common mode noise from the one or more first sense signals based on the second common mode noise signal from the one or more second sense signals; and during a second phase of the mutual capacitance scan of the touch sensor panel: simultaneously driving a second plurality of drive electrodes, different from the first plurality of drive electrodes; sensing one or more third sense signals from the one or more second sense electrodes, wherein the one or more third sense signals includes a second touch signal and a third common mode noise signal; sensing one or more fourth sense signals from the one or more first sense electrodes, wherein the one or more fourth sense signals includes a fourth common mode noise signal; and filtering a third common mode noise from the one or more third sense signals based on the common mode noise signal from the one or more fourth sense signals.

Additionally or alternatively, in some examples, the drive circuitry, sense circuitry, and/or logic circuitry is programmed to perform the respective steps described above. Additionally or alternatively, in some examples, the drive circuitry, sense circuitry, and/or logic circuitry is capable of performing the respective steps described above.

Additionally or alternatively, in some examples, at least one of the one or more first sense electrodes and at least one of the one or more second sense electrodes can be arranged in a column. Additionally or alternatively, in some examples, the one or more first sense signals and the one or more second sense signals can be concurrently sensed; and the one or more third sense signals and the one or more fourth sense signals can be concurrently sensed. Additionally or alternatively, in some examples, the device can further comprise a first display drive electrode, disposed beneath the one or more first sense electrodes and the one or more second sense electrodes, configured to provide data to a display. Additionally or alternatively, in some examples, the sense circuitry can comprise: a first single-ended amplifier coupled to one of the one or more first sense electrodes; a second single-ended amplifier coupled to one of the one or more second sense electrodes; and a summing circuit configured to subtract an output of the second single-ended amplifier from an output of the first single-ended amplifier. Additionally or alternatively, in some examples, the sense circuitry can comprise: a first single-ended amplifier coupled to one of the one or more first sense electrodes; a second single-ended amplifier coupled to one of the one or more second sense electrodes; a common mode amplifier, coupled to the one of the one or more first sense electrodes and one of the one or more second sense electrodes, configured to filter common mode noise; and an analog-to-digital converter (ADC).

Additionally or alternatively, in some examples, the sense circuitry can comprise: a first differential amplifier coupled to one of the one or more first sense electrodes and one of the one or more second sense electrodes; a common mode amplifier, coupled to the one of the one or more first sense electrodes and one of the one or more second sense electrodes, configured to filter common mode noise; and an analog-to-digital converter (ADC). Additionally or alternatively, in some examples, the sense circuitry can comprise: a first differential amplifier coupled to one of the one or more first sense electrodes and one of the one or more second sense electrodes; and an analog-to-digital converter (ADC). Additionally or alternatively, in some examples, the sense circuitry can comprise a plurality of sense channels, including a first sense channel and a second sense channel, and the sense circuitry can be capable of: during a first sense mode: perform a differential measurement using the first sense channel and the second sense channel; and during a second sense mode: perform a first single-ended measurement using the first sense channel; and perform a second single-ended measurement using the second sense channel.

Some examples of the disclosure are directed a device. In some examples, the device can comprise: drive circuitry configured to stimulate drive electrodes of a touch screen; sense circuitry configured to receive sense signals from sense electrodes of the touch screen; and logic circuitry coupled to the drive circuitry and the sense circuitry, configured to: during a mutual capacitance scan of the touch sensor panel: simultaneously driving a first plurality of drive electrodes and a second plurality of drive electrodes; sensing one or more first sense signals from one or more first sense electrodes, wherein the one or more first sense signals includes a first touch signal and a first common mode noise signal; sensing one or more second sense signals from one or more second sense electrodes, wherein the one or more second sense signals includes a second touch signal and a second common mode noise signal; filtering the first common mode noise from the one or more first sense signals based on the second common mode noise signal from the one or more second sense signals; and filtering the second common mode noise from the one or more second sense signals based on the common mode noise signal from the one or more first sense signals.

Additionally or alternatively, in some examples, the drive circuitry, sense circuitry, and/or logic circuitry is programmed to perform the respective steps described above. Additionally or alternatively, in some examples, the drive circuitry, sense circuitry, and/or logic circuitry is capable of performing the respective steps described above.

Additionally or alternatively, in some examples, the one or more first sense electrodes can be arranged in a first row; and the one or more second electrodes can be arranged in a second row. Additionally or alternatively, in some examples, the first row and the second row can be adjacent rows. Additionally or alternatively, in some examples, the first row and the second row are disposed a threshold distance apart. Additionally or alternatively, in some examples, at least one of the first plurality of drive electrodes and at least one of the second plurality of drive electrodes can be arranged in a column. Additionally or alternatively, in some examples, the first and second pluralities of drive electrodes can be interleaved along the column. Additionally or alternatively, in some examples, the one or more first sense signals and the one or more second sense signals can be concurrently sensed; and the one or more third sense signals and the one or more fourth sense signals can be concurrently sensed. Additionally or alternatively, the device can further comprise a first display drive electrode, disposed beneath the first and second pluralities of drive electrodes, configured to provide data to a display.

Additionally or alternatively, in some examples, the sense circuitry can comprise: a first single-ended amplifier coupled to one of the one or more first sense electrodes; a second single-ended amplifier coupled to one of the one or more second sense electrodes; and a summing circuit configured to subtract an output of the second single-ended amplifier from an output of the first single-ended amplifier. Additionally or alternatively, in some examples, the sense circuitry can comprise: a first single-ended amplifier coupled to one of the one or more first sense electrodes, a second single-ended amplifier coupled to one of the one or more second sense electrodes; a common mode amplifier, coupled to the one of the one or more first sense electrodes and the one of the one or more second sense electrodes, configured to filter common mode noise; and an analog-to-digital converter (ADC). Additionally or alternatively, in some examples, the sense circuitry can comprise: a first differential amplifier coupled to one of the one or more first sense electrodes and one of the one or more second sense electrodes; a common mode amplifier, coupled to the one of the one or more first sense electrodes and the one of the one or more second sense electrodes, configured to filter common mode noise; and an analog-to-digital converter (ADC).

Additionally or alternatively, in some examples, the sense circuitry can comprise: a first differential amplifier coupled to one of the one or more first sense electrodes and one of the one or more second sense electrodes; and an analog-to-digital converter (ADC). Additionally or alternatively, in some examples, the sense circuitry can comprise a plurality of sense channels, including a first sense channel and a second sense channel, wherein the sense circuitry can be capable of: during a first sense mode: perform a differential measurement using the first sense channel and the second sense channel; and during a second sense mode: perform a first single-ended measurement using the first sense channel; and perform a second single-ended measurement using the second sense channel.

Some examples of the disclosure are directed to a method. In some examples, the method can comprise: during a first phase of a mutual capacitance scan of a touch sensor panel: simultaneously driving a first plurality of drive electrodes; sensing one or more first sense signals from one or more first sense electrodes, wherein the one or more first sense signals includes a first touch signal and a first common mode noise signal; sensing one or more second sense signals from one or more second sense electrodes, wherein the one or more second sense signals includes a second common mode noise signal; and filtering the first common mode noise from the one or more first sense signals based on the second common mode noise signal from the one or more second sense signals; and during a second phase of the mutual capacitance scan of the touch sensor panel: simultaneously driving a second plurality of drive electrodes, different from the first plurality of drive electrodes; sensing one or more third sense signals from the one or more second sense electrodes, wherein the one or more third sense signals includes a second touch signal and a third common mode noise signal; sensing one or more fourth sense signals from the one or more first sense electrodes, wherein the one or more fourth sense signals includes a fourth common mode noise signal; and filtering a third common mode noise from the one or more third sense signals based on the common mode noise signal from the one or more fourth sense signals.

Additionally or alternatively, in some examples, the one or more first sense signals and the one or more second sense signals can be concurrently sensed. Additionally or alternatively, in some examples, the method can further comprise: during a first sense mode: performing a differential measurement using a first sense channel and a second sense channel; and during a second sense mode: performing a first single-ended measurement using the first sense channel; and performing a second single-ended measurement using the second sense channel.

Some examples of the disclosure are directed to a method. In some examples, the method can comprise: during a mutual capacitance scan of a touch sensor panel: simultaneously driving a first plurality of drive electrodes and a second plurality of drive electrodes; sensing one or more first sense signals from one or more first sense electrodes, wherein the one or more first sense signals includes a first touch signal and a first common mode noise signal; sensing one or more second sense signals from one or more second sense electrodes, wherein the one or more second sense signals includes a second touch signal and a second common mode noise signal; filtering the first common mode noise from the one or more first sense signals based on the second common mode noise signal from the one or more second sense signals; and filtering the second common mode noise from the one or more second sense signals based on the common mode noise signal from the one or more first sense signals.

Additionally or alternatively, in some examples, the one or more first sense signals and the one or more second sense signals can be concurrently sensed. Additionally or alternatively, in some examples, the method can further comprise:

during a first sense mode: performing a differential measurement using a first sense channel and a second sense channel; and during a second sense mode: performing a first single-ended measurement using the first sense channel; and performing a second single-ended measurement using the second sense channel.

Some examples of the disclosure are directed to a non-transitory computer readable storage medium. In some examples, the non-transitory computer readable medium can contain instructions that, when executed by a device including one or more processors, can perform a method, the method comprising: during a first phase of a mutual capacitance scan of a touch sensor panel: simultaneously driving a first plurality of drive electrodes; sensing one or more first sense signals from one or more first sense electrodes, wherein the one or more first sense signals includes a first touch signal and a first common mode noise signal; sensing one or more second sense signals from one or more second sense electrodes, wherein the one or more second sense signals includes a second common mode noise signal; and filtering the first common mode noise from the one or more first sense signals based on the second common mode noise signal from the one or more second sense signals; and during a second phase of the mutual capacitance scan of the touch sensor panel: simultaneously driving a second plurality of drive electrodes, different from the first plurality of drive electrodes; sensing one or more third sense signals from the one or more second sense electrodes, wherein the one or more third sense signals includes a second touch signal and a third common mode noise signal; sensing one or more fourth sense signals from the one or more first sense electrodes, wherein the one or more fourth sense signals includes a fourth common mode noise signal; and filtering a third common mode noise from the one or more third sense signals based on the common mode noise signal from the one or more fourth sense signals.

Additionally or alternatively, in some examples, the one or more first sense signals and the one or more second sense signals can be concurrently sensed. Additionally or alternatively, in some examples, the method can further comprise: during a first sense mode: performing a differential measurement using a first sense channel and a second sense channel; and during a second sense mode: performing a first single-ended measurement using the first sense channel; and performing a second single-ended measurement using the second sense channel.

Some examples of the disclosure are directed to a non-transitory computer readable storage medium. In some examples, the non-transitory computer readable medium can contain instructions that, when executed by a device including one or more processors, can perform a method, the method comprising: during a mutual capacitance scan of a touch sensor panel: simultaneously driving a first plurality of drive electrodes and a second plurality of drive electrodes; sensing one or more first sense signals from one or more first sense electrodes, wherein the one or more first sense signals includes a first touch signal and a first common mode noise signal; sensing one or more second sense signals from one or more second sense electrodes, wherein the one or more second sense signals includes a second touch signal and a second common mode noise signal; filtering the first common mode noise from the one or more first sense signals based on the second common mode noise signal from the one or more second sense signals; and filtering the second common mode noise from the one or more second sense signals based on the common mode noise signal from the one or more first sense signals.

Additionally or alternatively, in some examples, the one or more first sense signals and the one or more second sense signals can be concurrently sensed. Additionally or alternatively, in some examples, the method can further comprise: during a first sense mode: performing a differential measurement using a first sense channel and a second sense channel; and during a second sense mode: performing a first single-ended measurement using the first sense channel; and performing a second single-ended measurement using the second sense channel.

It is understood that any element described above as being "configured to" perform respective functions or steps or operate in a respective manner can, in some examples, be programmed to or be capable of performing those respective functions or steps or operate in the respective manner. Similarly, any element described above as being "capable of" performing respective functions or steps or operate in a respective manner can, in some examples, be programmed to or be configured to perform those respective functions or steps or operate in the respective manner. Similarly, any element described above as being "programmed to" perform respective functions or steps or operate in a respective manner can, in some examples, be configured to or be capable of performing those respective functions or steps or operate in the respective manner.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

The invention claimed is:

1. A device comprising:
drive circuitry configured to stimulate drive electrodes of a touch sensor panel;
sense circuitry configured to receive sense signals from sense electrodes of the touch sensor panel; and
logic circuitry coupled to the drive circuitry and the sense circuitry, configured to:
during a first phase of a mutual capacitance scan of the touch sensor panel:
simultaneously driving a first plurality of drive electrodes;
sensing one or more first sense signals from one or more first sense electrodes, wherein the one or more first sense signals includes a first touch signal and a first common mode noise signal;
sensing one or more second sense signals from one or more second sense electrodes, wherein the one or more second sense signals includes a second common mode noise signal; and
filtering the first common mode noise from the one or more first sense signals based on the second common mode noise signal from the one or more second sense signals; and
during a second phase of the mutual capacitance scan of the touch sensor panel:
simultaneously driving a second plurality of drive electrodes, different from the first plurality of drive electrodes;
sensing one or more third sense signals from the one or more second sense electrodes, wherein the one or more third sense signals includes a second touch signal and a third common mode noise signal;

sensing one or more fourth sense signals from the one or more first sense electrodes, wherein the one or more fourth sense signals includes a fourth common mode noise signal;

filtering a third common mode noise from the one or more third sense signals based on the fourth common mode noise signal from the one or more fourth sense signals.

2. The device of claim 1, wherein at least one of the one or more first sense electrodes and at least one of the one or more second sense electrodes are arranged in a column.

3. The device of claim 1, wherein:
the one or more first sense signals and the one or more second sense signals are concurrently sensed; and
the one or more third sense signals and the one or more fourth sense signals are concurrently sensed.

4. The device of claim 1, further comprising:
a first display drive electrode, disposed beneath the one or more first sense electrodes and the one or more second sense electrodes, configured to provide data to a display.

5. The device of claim 1, wherein the sense circuitry comprises:
a first single-ended amplifier coupled to one of the one or more first sense electrodes;
a second single-ended amplifier coupled to one of the one or more second sense electrodes; and
a summing circuit configured to subtract an output of the second single-ended amplifier from an output of the first single-ended amplifier.

6. The device of claim 1, wherein the sense circuitry comprises:
a first single-ended amplifier coupled to one of the one or more first sense electrodes;
a second single-ended amplifier coupled to one of the one or more second sense electrodes;
a common mode amplifier, coupled to the one of the one or more first sense electrodes and one of the one or more second sense electrodes, configured to filter common mode noise; and
an analog-to-digital converter (ADC).

7. The device of claim 1, wherein the sense circuitry comprises:
a first differential amplifier coupled to one of the one or more first sense electrodes and one of the one or more second sense electrodes;
a common mode amplifier, coupled to the one of the one or more first sense electrodes and one of the one or more second sense electrodes, configured to filter common mode noise; and
an analog-to-digital converter (ADC).

8. The device of claim 1, wherein the sense circuitry comprises:
a first differential amplifier coupled to one of the one or more first sense electrodes and one of the one or more second sense electrodes; and
an analog-to-digital converter (ADC).

9. The device of claim 1, wherein:
the sense circuitry comprises a plurality of sense channels, including a first sense channel and a second sense channel, wherein the sense circuitry is configured to:
during a first sense mode:
perform a differential measurement using the first sense channel and the second sense channel; and
during a second sense mode:
perform a first single-ended measurement using the first sense channel; and
perform a second single-ended measurement using the second sense channel.

10. A method comprising:
during a first phase of a mutual capacitance scan of a touch sensor panel:
simultaneously driving a first plurality of drive electrodes;
sensing one or more first sense signals from one or more first sense electrodes, wherein the one or more first sense signals includes a first touch signal and a first common mode noise signal;
sensing one or more second sense signals from one or more second sense electrodes, wherein the one or more second sense signals includes a second common mode noise signal; and
filtering the first common mode noise from the one or more first sense signals based on the second common mode noise signal from the one or more second sense signals; and
during a second phase of the mutual capacitance scan of the touch sensor panel:
simultaneously driving a second plurality of drive electrodes, different from the first plurality of drive electrodes;
sensing one or more third sense signals from the one or more second sense electrodes, wherein the one or more third sense signals includes a second touch signal and a third common mode noise signal;
sensing one or more fourth sense signals from the one or more first sense electrodes, wherein the one or more fourth sense signals includes a fourth common mode noise signal; and
filtering a third common mode noise from the one or more third sense signals based on the fourth common mode noise signal from the one or more fourth sense signals.

11. The method of claim 10, wherein the one or more first sense signals and the one or more second sense signals are concurrently sensed.

12. The method of claim 10, further comprising:
during a first sense mode:
performing a differential measurement using a first sense channel and a second sense channel; and
during a second sense mode:
performing a first single-ended measurement using the first sense channel; and
performing a second single-ended measurement using the second sense channel.

13. A non-transitory computer readable storage medium, the computer readable medium containing instructions that, when executed by a device including one or more processors, performs a method comprising:
during a first phase of a mutual capacitance scan of the touch sensor panel:
simultaneously driving a first plurality of drive electrodes;
sensing one or more first sense signals from one or more first sense electrodes, wherein the one or more first sense signals includes a first touch signal and a first common mode noise signal;
sensing one or more second sense signals from one or more second sense electrodes, wherein the one or more second sense signals includes a second common mode noise signal; and filtering the first common mode noise from the one or more first sense signals based on the second common mode noise signal from the one or more second sense signals; and during a second phase of the mutual capacitance scan of the touch sensor panel:
  simultaneously driving a second plurality of drive electrodes, different from the first plurality of drive electrodes;
  sensing one or more third sense signals from the one or more second sense electrodes, wherein the one or more third sense signals includes a second touch signal and a third common mode noise signal;
  sensing one or more fourth sense signals from the one or more first sense electrodes, wherein the one or more fourth sense signals includes a fourth common mode noise signal; and
  filtering a third common mode noise from the one or more third sense signals based on the fourth common mode noise signal from the one or more fourth sense signals.

14. The non-transitory computer readable storage medium of claim 13, wherein the one or more first sense signals and the one or more second sense signals are concurrently sensed.

15. The non-transitory computer readable storage medium of claim 13, the method further comprising:
  during a first sense mode:
    performing a differential measurement using a first sense channel and a second sense channel; and
  during a second sense mode:
    performing a first single-ended measurement using the first sense channel; and
    performing a second single-ended measurement using the second sense channel.

\* \* \* \* \*